United States Patent [19]
Okubo et al.

[11] Patent Number: 5,676,518
[45] Date of Patent: Oct. 14, 1997

[54] UNSTACKING FEEDER

[75] Inventors: Yasunori Okubo, Toyama-ken; Shigekazu Noda, Ishikawa-ken, both of Japan

[73] Assignee: Kabushiki Kaisha Komatsu Seisakusho, Japan

[21] Appl. No.: 436,195

[22] PCT Filed: Nov. 24, 1993

[86] PCT No.: PCT/JP93/01722

§ 371 Date: May 10, 1995

§ 102(e) Date: May 10, 1995

[87] PCT Pub. No.: WO94/12416

PCT Pub. Date: Jun. 9, 1994

[30] Foreign Application Priority Data

Nov. 25, 1992 [JP] Japan ................... 4-336831
Nov. 25, 1992 [JP] Japan ................... 4-336832
Nov. 25, 1992 [JP] Japan ................... 4-336833

[51] Int. Cl.⁶ ......................................... B65G 59/02
[52] U.S. Cl. ............................ 414/797.1; 414/792.1; 414/900
[58] Field of Search ............................ 414/900, 901, 414/796.7, 797, 797.1

[56] References Cited

U.S. PATENT DOCUMENTS

| | | | |
|---|---|---|---|
| 4,024,963 | 5/1977 | Hautau | 414/797.1 |
| 4,815,916 | 3/1989 | Beck | 414/797.1 |
| 4,946,341 | 8/1990 | Parsley et al. | 414/797.1 |

FOREIGN PATENT DOCUMENTS

| | | |
|---|---|---|
| 43 41 925 A1 | 6/1994 | Germany. |
| 43 41 926 A1 | 6/1995 | Germany. |
| 44 09 532 A1 | 9/1995 | Germany. |
| 58-23522 | 2/1983 | Japan. |
| 58-141819 | 8/1983 | Japan. |
| 62-255314 | 11/1987 | Japan. |
| 63-189440 | 12/1988 | Japan. |
| 70334 | 3/1990 | Japan ................ 414/797.1 |
| 2148736 | 12/1990 | Japan. |
| 3198931 | 8/1991 | Japan. |

Primary Examiner—Karen B. Merritt
Assistant Examiner—Gregory A. Morse
Attorney, Agent, or Firm—Ronald P. Kananen

[57] ABSTRACT

An unstacking feeder capable of unstacking sheet materials efficiently from a sheet stack has a sheet stack transfer device (3) for transferring a sheet stack, which consists of a plurality of stacked sheet materials (1a), along a circulating transport configuration extending across a predetermined unstacking position (A). In order to separate individual sheet materials from a sheet stack in order, a floater (6) is selected and supplied automatically in accordance with the configuration of the sheet materials by a floater supply mechanism (5, 7, 7d). Each unstacked sheet material is transferred to equipment in the subsequent stage, such as a transfer feeder by sheet material transporting arrangements (11, 19). During this period, each sheet material (1a) separated by the floater (6) is transferred onto a sheet material transporting arrangement by a sheet material transfer device (9).

12 Claims, 38 Drawing Sheets

UNSTACKING FEEDER

FIELD OF THE INVENTION

The present invention relates to an unstacking feeder designed for sequentially or selectively supplying a plurality of sheet stacks on a pallet to a press.

BACKGROUND ART

Conventionally, when a sheet material is supplied to a press, an unstacking feeder is arranged at the upstream side of the press. Each individual sheet material separated in one by one basis is transported to a position where a transfer feeder provided at a press side may grip the sheet material, by an unstacking feeder.

In case of the conventional unstacking feeder, when a plurality of kinds of sheet materials are automatically supplied to an unstacking position, a method for directly infeeding the sheet materials to the unstacking position by means of an automatically guided vehicle (AGV) has been employed.

Also, for the unstacking feeder, a magnetic floater for separating each individual sheet material is provided. The magnetic floater has to be adjusted to the position of a floater member adapting to a configuration of the sheet material when the configuration of the sheet material to be supplied to the press is varied. Such adjusted magnetic floater is set adjacent to the unstacking feeder.

However, in the conventional unstacking feeder, when one sheet stack is loaded on a pallet, upon completion of supplying of the sheet stack, it becomes necessary to exchange the empty pallet with a pallet mounted with the sheet stack to be supplied next. Thus, it takes time for exchanging the pallet, thereby making productivity low.

On the other hand, in the conventional unstacking feeder as set forth above, an AGV as to be provided for each kind of the sheet material to make the facility cost high.

Furthermore, in the conventional unstacking feeder, substantial time is required for exchanging the magnetic floater, thereby lowering work efficiency. Also, since supply of the sheet material is interrupted during exchanging of the magnetic floater, lowering of productivity can be caused.

SUMMARY OF THE INVENTION

Therefore, it is an object of the present invention to provide an unstacking feeder which can automatically feed a pallet mounted with a sheet stack to an unstacking position by circulating the pallets to lower facility cost.

Another object of the present invention is to provide an unstacking feeder which can sequentially or selectively supply a plurality of sheet stacks mounted on a pallet to reduce frequency of exchanging of the pallet and thus improve productivity.

A further object of the present invention to provide an automatic floater exchanging device of an unstacking feeder which can exchange the floater in a short period.

In order to accomplish the above-mentioned objects, an unstacking feeder, in accordance with the first aspect of the invention, comprises:

a pallet transporting device for sequentially infeeding a plurality of pallets, each mounted with a plurality of stacks of sheet stacks to the unstacking position and outfeeding the pallet which completed feeding of the sheet stack from the unstacking position;

a floater exchanging device positioned above the unstacking position and reciprocating between a floater rack storing a plurality of floaters for deformed materials and the unstacking position for transporting the floater for deformed material taken out from the floater rack to the unstacking position, and storing the used floater for the deformed material to the floater rack; and a vacuum lifter provided at the unstacking position and attracting a sheet material separated from the sheet stack by the floater to transport to a magnetic conveyer.

By the foregoing first aspect of the invention, since the sheet stack can be automatically supplied by the pallet to the unstacking position, even when a plurality of kinds of sheet stacks are to be supplied to a press, it becomes unnecessary to provide an AGV for each respective kind and thus is economical.

According to the second aspect of the invention, an unstacking feeder comprises:

a pallet transporting device infeeding a plurality of pallets, each mounted with a plurality of stacks of sheet stacks in predetermined arrangement to the unstacking position and outfeeding the pallet which completed feeding of the sheet stack from the unstacking position;

an X-Y table arranged at the unstacking position for positioning a selected one of the sheet stacks on the pallet at the unstacking position by shifting the infed pallet in the X-axis direction and the Y-axis direction to the unstacking position; and a stack lifter positioned below the unstacking position and lifting up the sheet stack positioned at an unstacking point through a through opening in the pallet, at a position where a vacuum lifter may hold the sheet stack.

With the foregoing second aspect of the invention, a plurality of stacks of sheet stacks mounted on the pallet can be sequentially or selectively supplied to the press. Therefore, pallet exchanging frequency and pallet exchanging period can be significantly reduced and thus productivity can be improved.

According to the third aspect of the invention, an automatic floater exchanging apparatus of the unstacking feeder comprises:

a floater rack provided in the vicinity of an unstacking position upstream of a press, and storing a plurality of floaters for deformed material, in each of which the position of a floater member is adjusted adapting to the configuration of a sheet material;

a floater exchanging device has a shuttle movably positioned and reciprocating between the floater rack and the unstacking position for transporting the floater for deformed material taken out from the floater rack to the unstacking position, and storing the used floater for the deformed material to the floater rack; and a floater transferring mechanism provided in the vicinity of the floater exchanging device for pulling out the floater for deformed material in the floater rack to a shuttle and storing the floater for the deformed material on the shuttle to the floater rack.

With the foregoing third aspect, even when the configuration of the sheet material to be supplied to the press is varied, since one of the floaters for the deformed material stored in the floater rack, in which the position of the floater member is preliminarily adjusted, can be selected to the unstacking position automatically, the floater exchanging time can be significantly reduced.

According to the fourth aspect of the invention, an unstacking feeder comprises:

a pallet transporting device for sequentially infeeding a plurality of pallets, each mounted with a plurality of stacks of sheet stacks to the unstacking position and outfeeding the pallet which completed feeding of the sheet stack from the unstacking position;

a floater exchanging device positioned above the unstacking position and reciprocating between a floater rack storing a plurality of floaters for deformed materials and the unstacking position for transporting the floater for deformed material taken out from the floater rack to the unstacking position A, and storing the used floater for the deformed material to the floater rack;

a floater transferring mechanism provided in the vicinity of the floater exchanging device for pulling out the floater for deformed material in the floater rack to a shuttle and storing the used floater for the deformed material on the shuttle to the floater rack; and a vacuum lifter provided at the unstacking position and attracting a sheet material separated from the sheet stack by the floater to transport to a magnetic conveyer.

According to the fifth aspect of the invention, an unstacking feeder comprises:

sheet stack transporting means for transporting a sheet stack, in which a plurality of sheet materials are stacked, through a circulating transporting path across a predetermined unstacking position;

floater supply means for automatically supplying a floater corresponding to the configuration of the sheet material to the unstacking position for sequentially separating respective individual sheet material of the sheet stack;

sheet material transporting means for transporting unstacked individual sheet material to a next process; and sheet material transferring means for transferring the individual sheet material separated by the floater to the sheet material transporting means.

It should be noted that, in the foregoing construction, the sheet stack transporting means may include a pallet moved along the circulating transporting path, and the sheet stack is mounted on the pallet to be transported. In this case, the pallet may be designed for mounting with a plurality of sheet stacks at respective predetermined positions, and has means for positioning one of a plurality of sheet stacks to a predetermined unstacking point within the unstacking position.

Also, preferably, the floater supply means includes a floater storage means arranged in the vicinity of the unstacking position at the side of the circulating transporting path, the floater storage means is designed for storing a plurality of floaters corresponding to mutually different configurations of the sheet materials, and the floater supply means selects one of the floaters stored in the floater storage means depending upon the configuration of the sheet material to supply to the unstacking position. In this case, the floater supply means may include a shuttle means for reciprocating between the floater storage means and the unstacking position, and a floater transferring means for transferring the floater between the floater storage means and the shuttle.

According to the sixth aspect of the invention, an unstacking feeder comprises:

sheet stack transporting means for transporting a plurality of sheet stack mounted on the sheet stack transporting means through a circulating transporting path across a predetermined unstacking position;

floater storage means arranged in the vicinity of the circulating transporting path for storing a plurality of floaters corresponding to configuration of respective sheet materials for sequentially separating each individual sheet material in the sheet stack;

floater selecting and supplying means for selecting one of the floaters stored in the floater storage means depending upon the configuration of the sheet material for automatically selecting and supplying the one of the floaters to the unstacking position;

sheet material transporting means for transporting unstacked individual sheet material to a next process; and sheet transferring means for transferring the individual sheet material separated by the floater to the sheet material transporting means.

According to the seventh aspect of the invention, an unstacking feeder comprises:

sheet stack transporting means for transporting a plurality of sheet stack mounted on the sheet stack transporting means through a circulating transporting path across a predetermined unstacking position;

floater storage means arranged in the vicinity of the circulating transporting path for storing a plurality of floaters corresponding to configuration of respective sheet materials for sequentially separating each individual sheet material in the sheet stack;

floater automatic selecting and supplying means for selecting one of the floaters stored in the floater storage means depending upon the configuration of the sheet material for automatically selecting and supplying the one of the floaters to the unstacking position, and comprising shuttle means for reciprocally moving between the floater storage means and the unstacking position and floater transferring means for transferring floater between the floater storage means and the shuttle;

sheet material transporting means for transporting unstacked individual sheet material to a next process; and sheet transferring means for transferring the individual sheet material separated by the floater to the sheet material transporting means.

According to the eighth aspect of the invention, an unstacking feeder comprises:

sheet stack transporting means for transporting a plurality of sheet stacks mounted on the sheet stack transporting means along a circulating transporting path across an unstacking position;

sheet stack positioning means for positioning a selected one of the sheet stacks to a predetermined unstacking point in the unstacking position;

sheet material transporting means for transporting each individual sheet material sequentially unstacked from the sheet stack positioned at the unstacking point; and sheet material transfer means for unstacking each individual sheet material at the unstacking point and transferring the sheet material to the sheet material transporting means.

According to the ninth aspect of the invention, an unstacking feeder comprises:

sheet stack transporting means for transporting a plurality of sheet stacks mounted on the sheet stack transporting means along a circulating transporting path across an unstacking position;

sheet stack positioning means for positioning a selected one of the plurality of sheet stacks to a predetermined unstacking point in the unstacking position;

floater storage means arranged in the vicinity of a circulating transporting path for storing a plurality of floaters corresponding to configuration of respective sheet materials for sequentially separating each individual sheet material in the sheet stack;

floater selecting and supplying means for selecting one of the floaters stored in the floater storage means depending upon the configuration of the sheet material for automatically selecting and supplying the one of the floaters to the unstacking position;

sheet material transporting means for transporting unstacked individual sheet material to a next process; and sheet transferring means for transferring the individual sheet material separated by the floater to the sheet material transporting means.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

BEST MODE FOR IMPLEMENTING THE INVENTION

One embodiment of the present invention will be discussed in detail with reference to the drawings.

Figure 1:
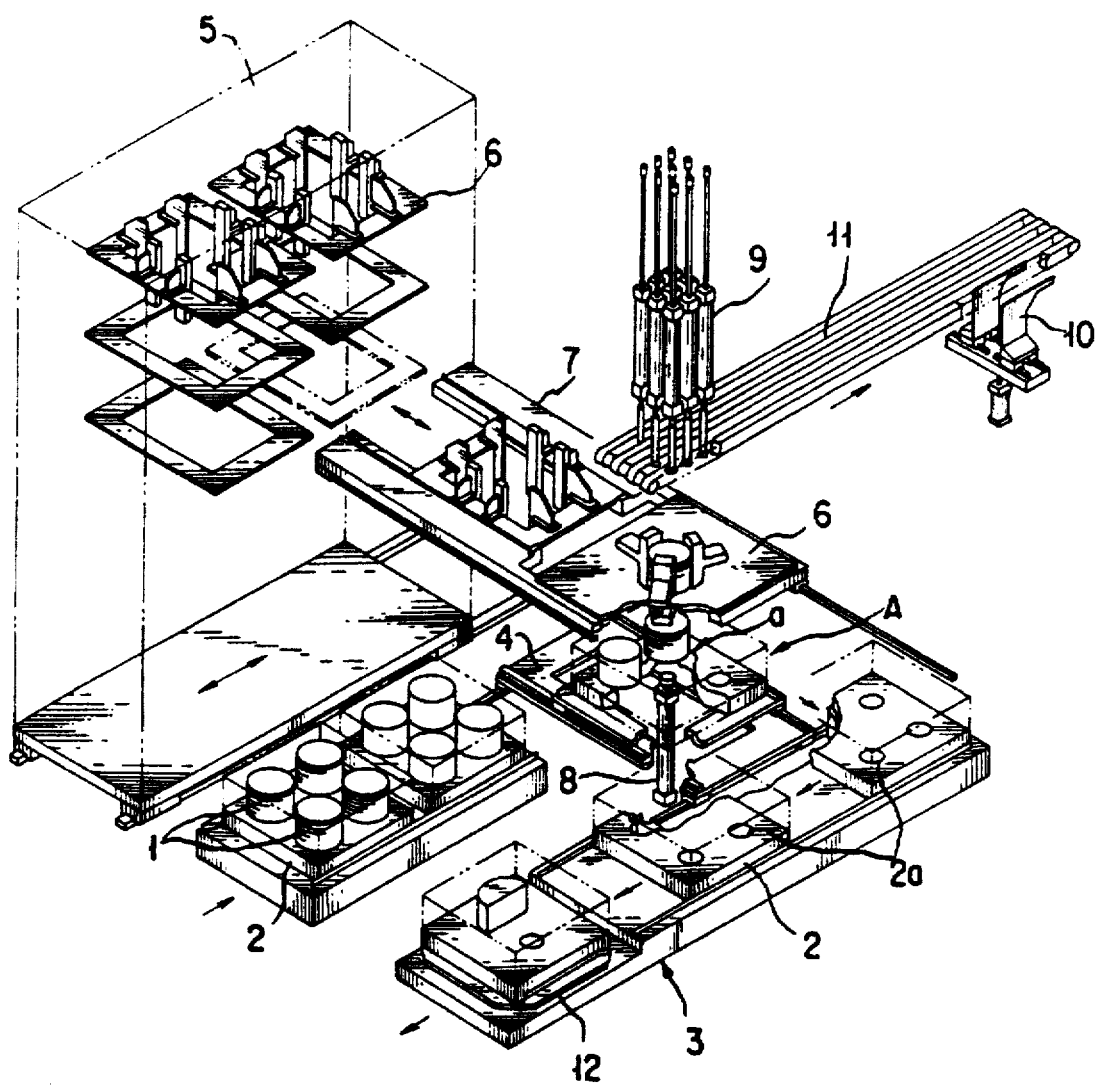
FIG. 1 is a perspective view showing an overall construction of one embodiment of an unstacking feeder according to the invention.

FIG. 1 is an overall perspective view of an unstacking feeder. As shown in FIG. 1, a pallet transporting device 3 of the unstacking feeder is designed to circulate pallets 2 mounted with a plurality of sheet stacks 1 across a predetermined unstacking position A. In the pallet 2 mounted with the sheet stacks 1, a plurality of through holes 2a vertically extending at stack mounting positions, are opened. At the side portion of the pallet transporting device 3, a floater rack 5 storing a plurality of magnetic floaters 6 is provided. At the unstacking position A, an X-Y table 4 is provided for moving the sheet stack 1 mounted on the pallet 2 to an unstacking point a by moving in X-axis and Y-axis directions. Between the unstacking position A and the floater rack 5, a floater exchanging device 7 for selecting one of a plurality of magnetic floaters 6 stored in the floater rack 5 and shifting the one to the unstacking position A, is provided. At the unstacking position A, a stack lifter 8 is provided, which is extracted and retracted through the through hole 2a formed in the pallet 2 for lifting the sheet stack 1 on the pallet 2 up and down. On the other hand, above the unstacking point a, a vacuum lifter 9 which attracts an uppermost one of the sheets in the sheet stack 1 lifted up by the stack lifter 8, and a magnetic conveyer 11 for transporting a sheet material 1a attracted by the vacuum lifter 9 to a skid lifter 10 provided at a gripping position of a transfer feeder 30 (FIG. 2), are provided. At the outfeeding side of the pallet transporting device 3, a pallet reversing device 12 for turning the pallet 2 mounted with the sheet stack 1 to change orientation of the sheet stack 1, is provided.

Figure 2:
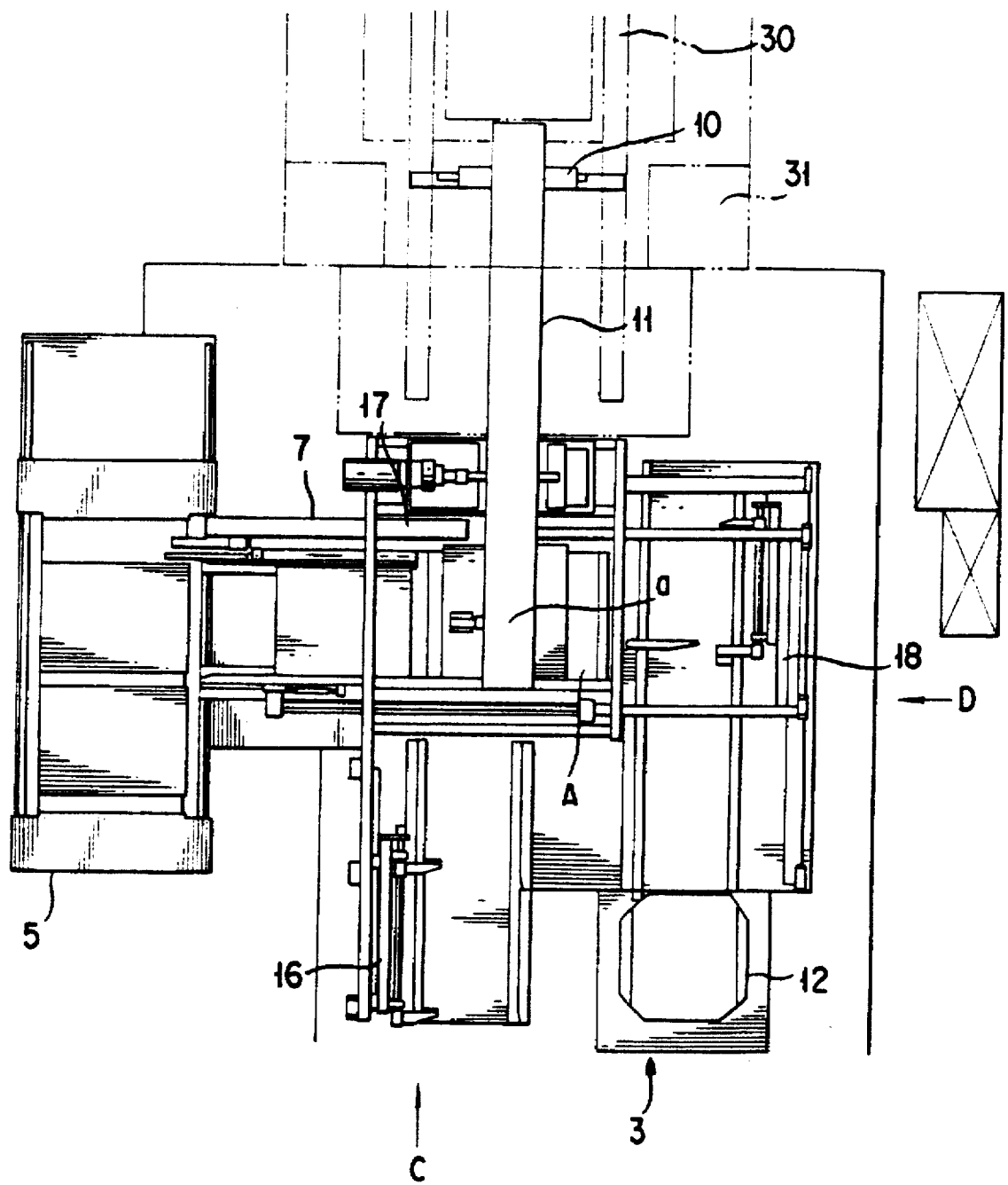
FIG. 2 is a plan view of the overall construction of one embodiment of the unstacking feeder according to the invention.
Figure 3:
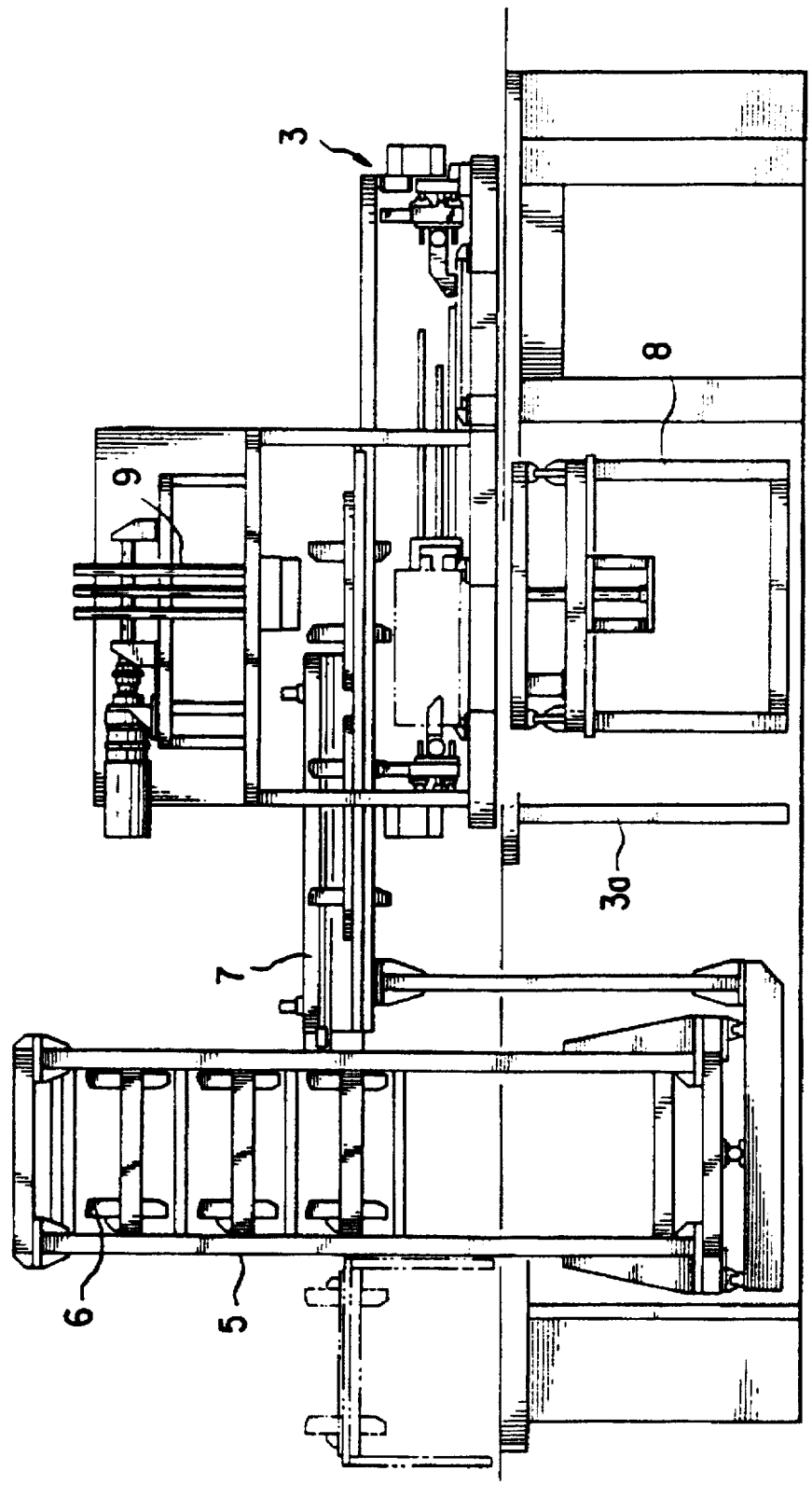
FIG. 3 is an illustration as seen in the direction of arrow C of FIG. 2.
Figure 4:
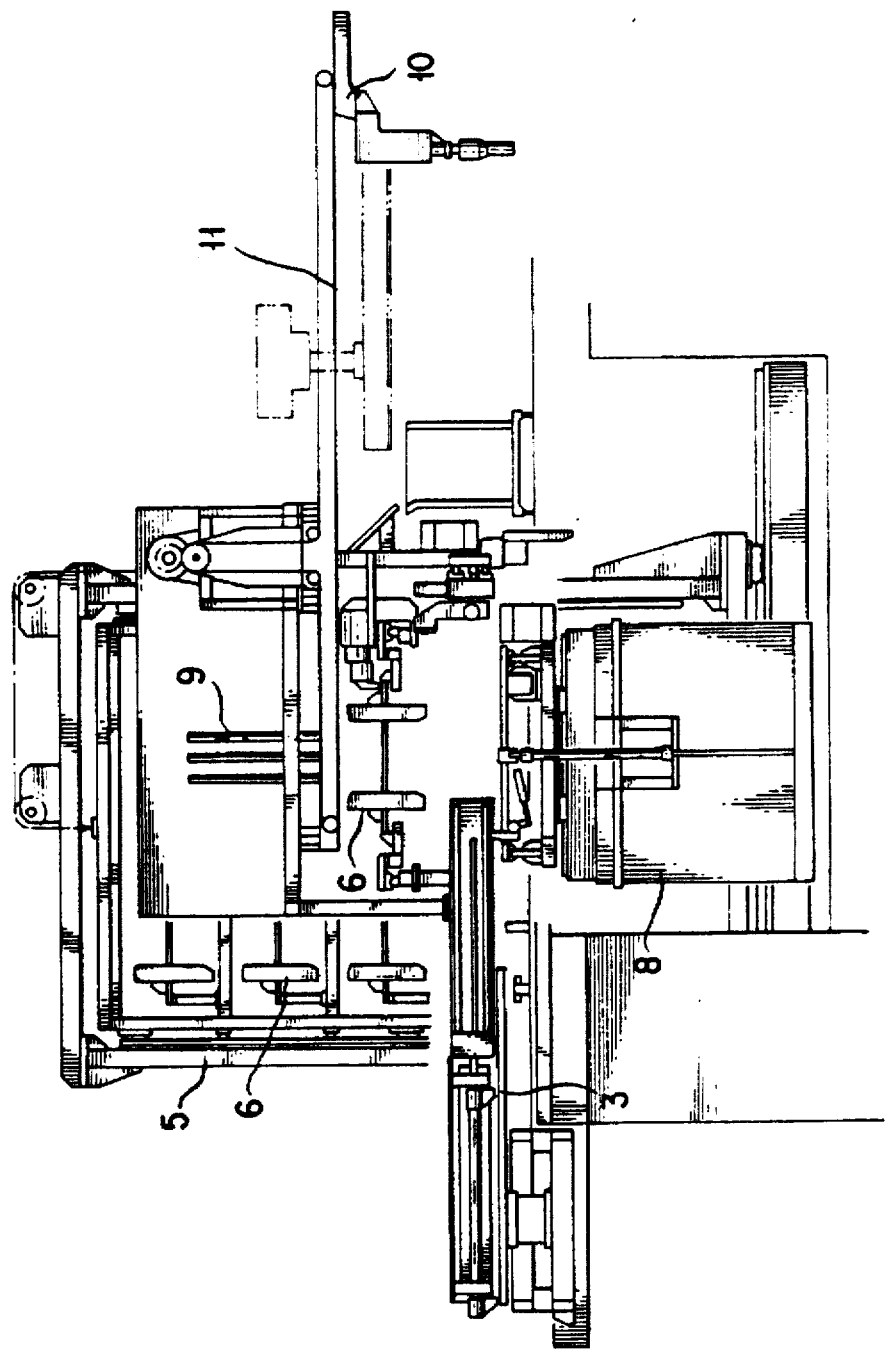
FIG. 4 is an illustration as seen in the direction of arrow D of FIG. 2.
Figure 5:
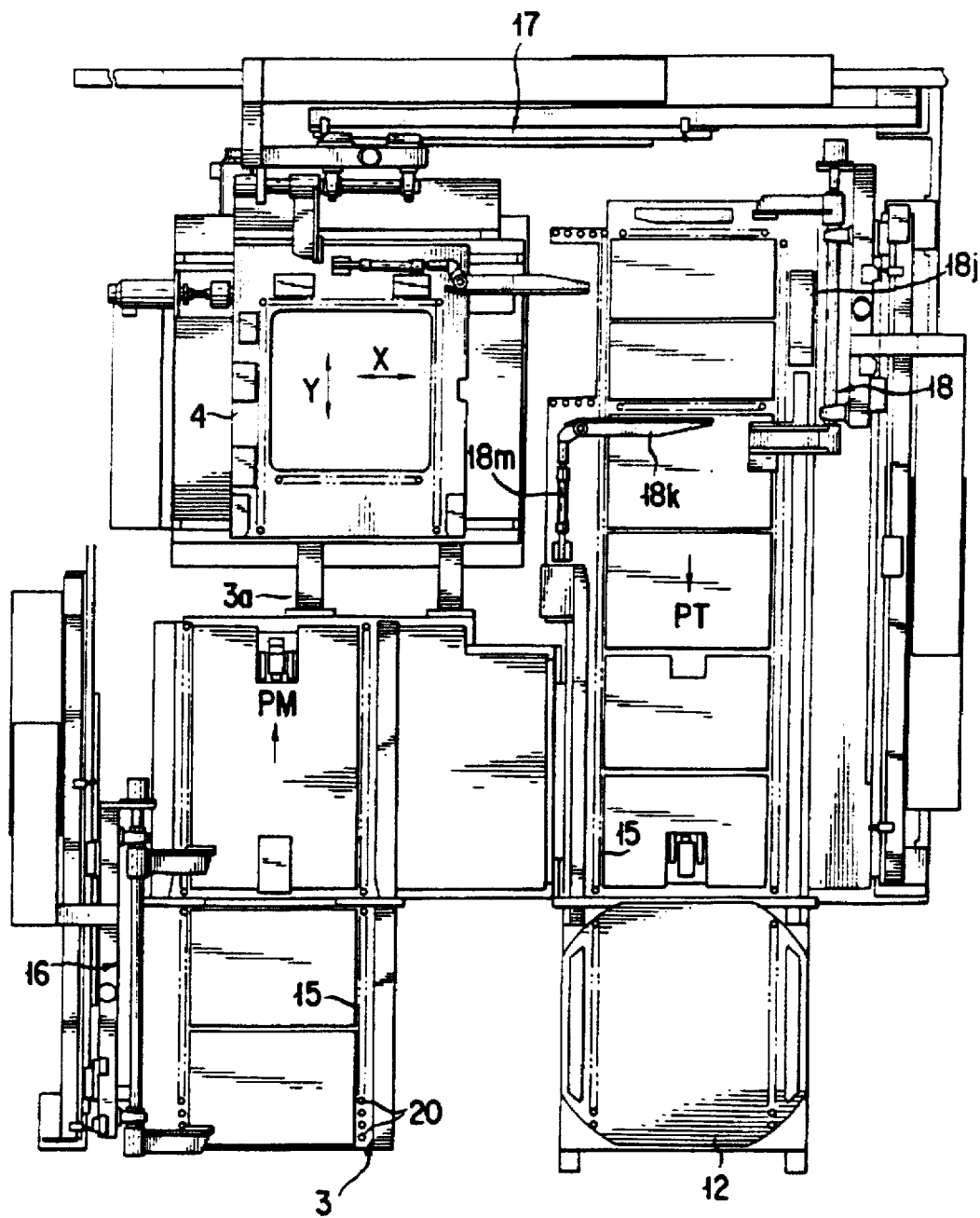
FIG. 5 is a plan view of a pallet transporting device of one embodiment of the unstacking feeder according to the invention.
Figure 6:
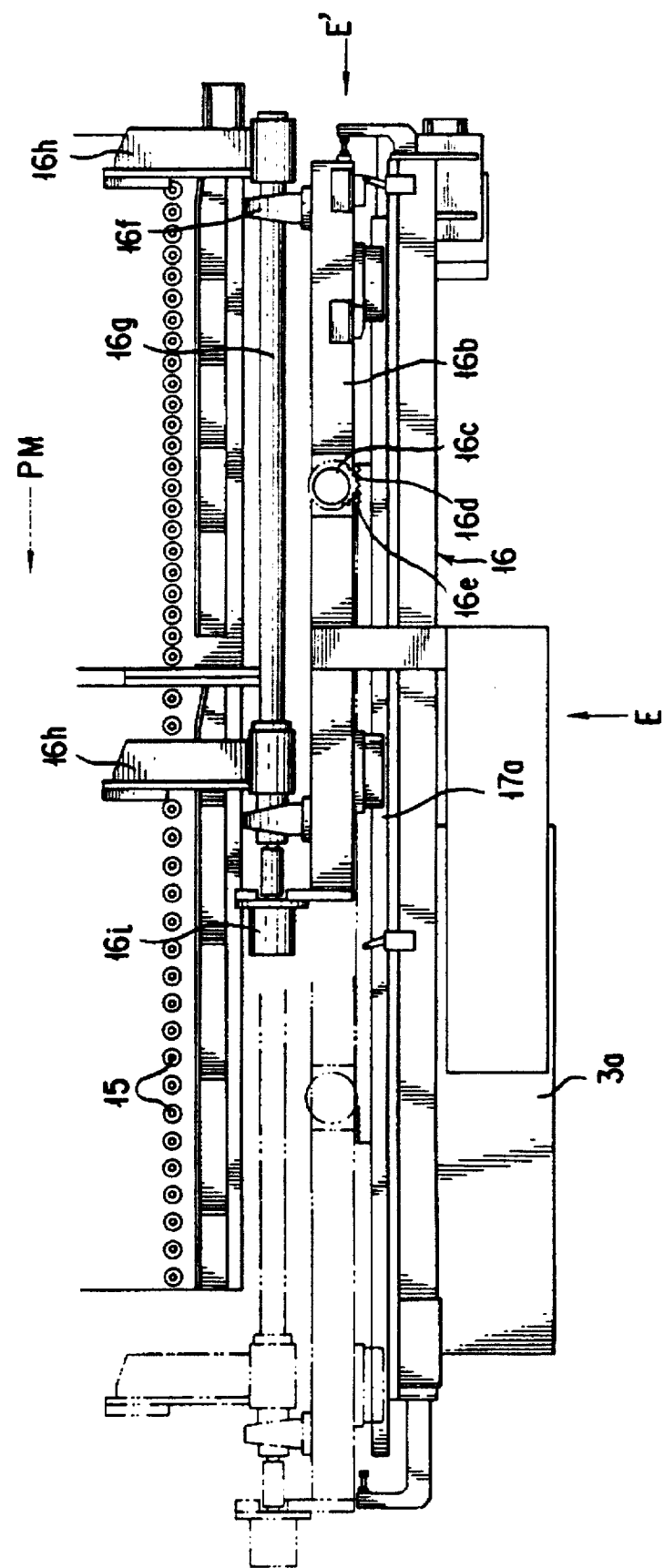
FIG. 6 is a plan view of a infeed pallet shifter of one embodiment of the pallet transporting device according to the invention.

The pallet transporting device 3 transporting the pallet 2 to the unstacking position A, has a platform 3a, on which a roller conveyer 15 is provided in the moving direction of the pallet 2, as shown in FIG. 5. As shown in FIGS. 2, 5 and 6, an infeed pallet shifter 16, a cross pallet shifter 17 and an outfeed pallet shifter 18 are mounted to the pallet transporting device 3.

Figure 7:
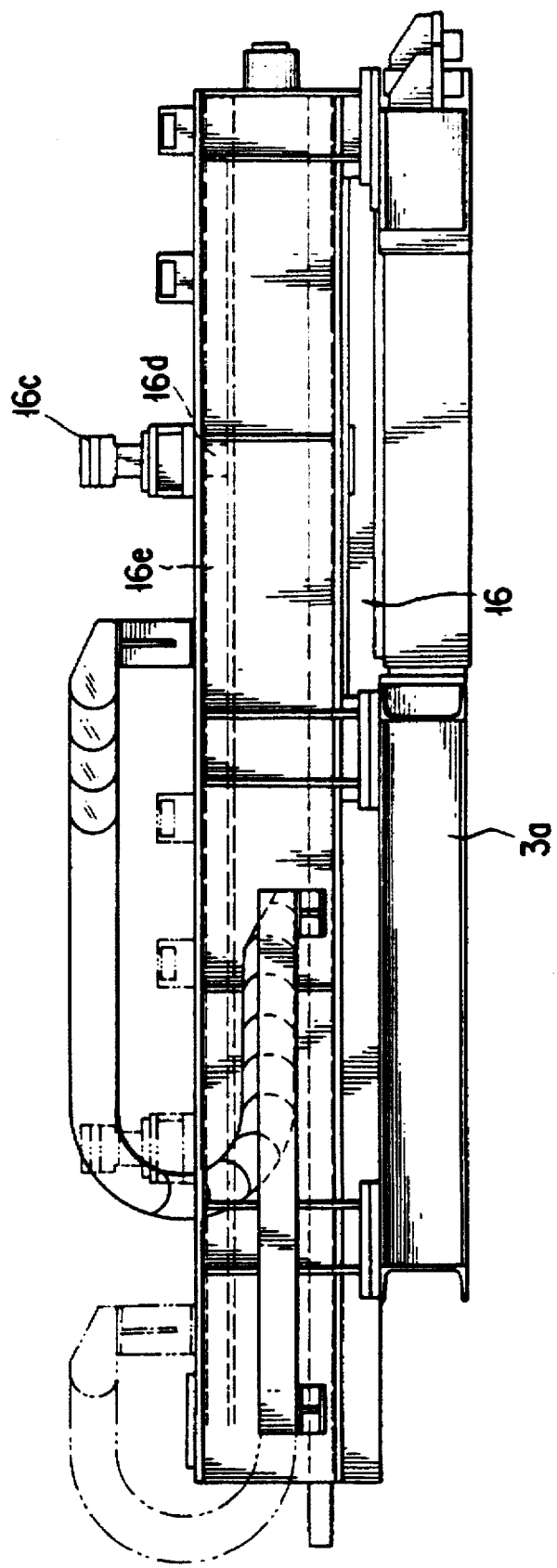
FIG. 7 is an illustration as seen in the direction of arrow E of FIG. 6.
Figure 8:
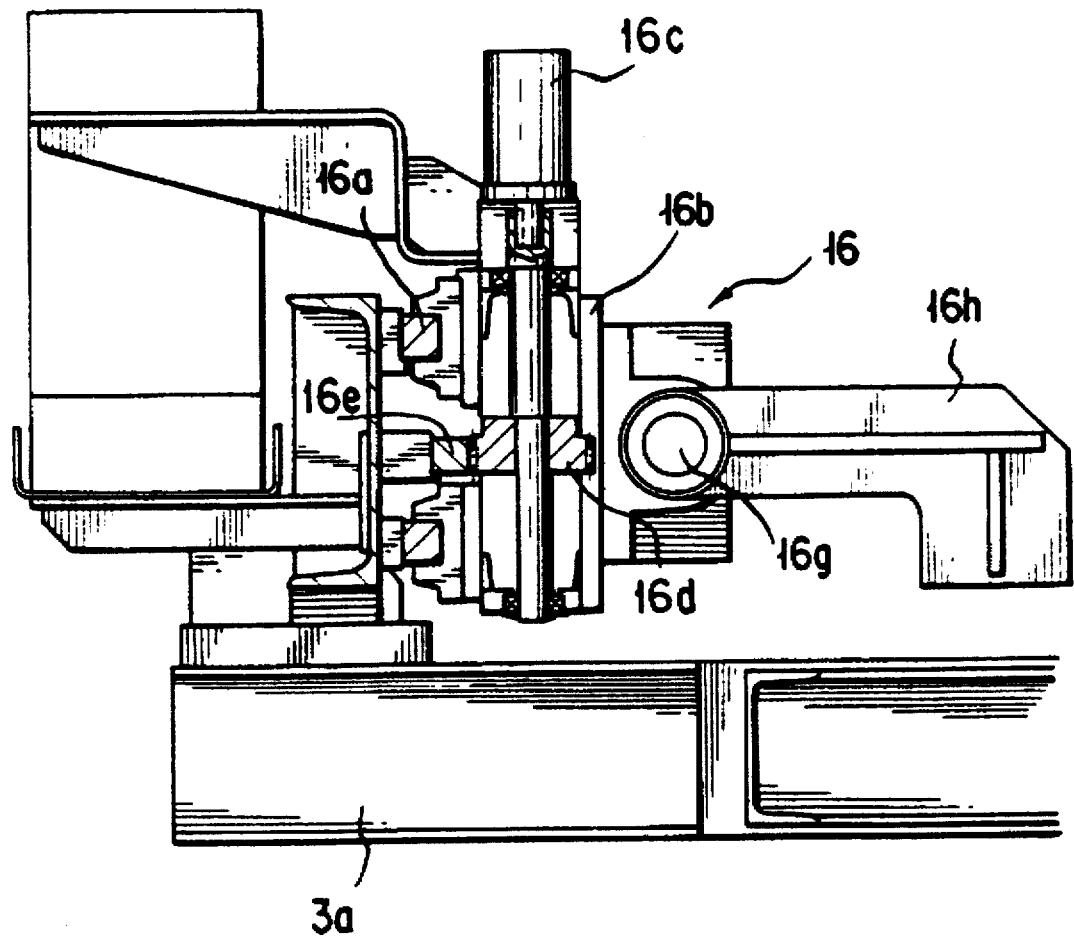
FIG. 8 is an illustration as seen in the direction of arrow E' of FIG. 6.

The infeed pallet shifter 16 is positioned at the infeed side of the pallet transporting device 3, as shown in FIGS. 6 to 8, and has guide rails 16a extending in the moving direction (arrow PM) of the pallet 2. On the guide rail 16a, a movable base 16b is supported in shiftable fashion.

On the movable base 16b, a traveling motor 16c is mounted. A pinion 16d rotatingly driven by the traveling motor 16c meshes with a rack 16e provided along the guide rail 16a. Thus, the movable base 16b is driven by the traveling motor 16c to move along the guide rail 16a.

On the movable base 16b, a rotary shaft 16g is supported via a bearing 16f along the shifting direction. At both ends of the rotary shaft 16g, a pair of claw bodies 16h are provided with a gap slightly greater than the length of one side of the pallet 2. These claw members 16h are designed to be pivoted into a substantially upright position from a horizontal position by rotating the rotary shaft 16g by a rotary actuator 16i connected to one end of the rotary shaft 16g.

Figure 9:
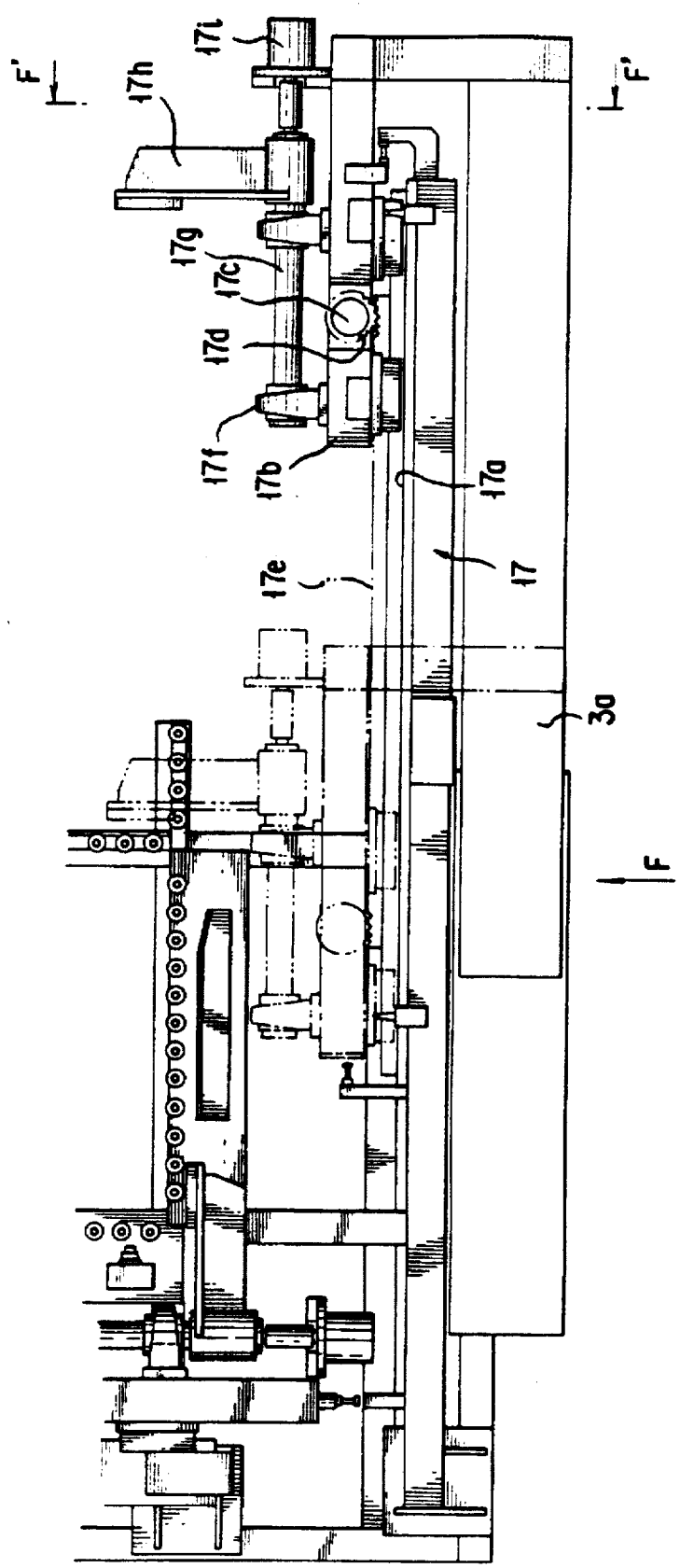
FIG. 9 is a plan view of a cross pallet shifter of one embodiment of the pallet transporting device of the invention.
Figure 10:
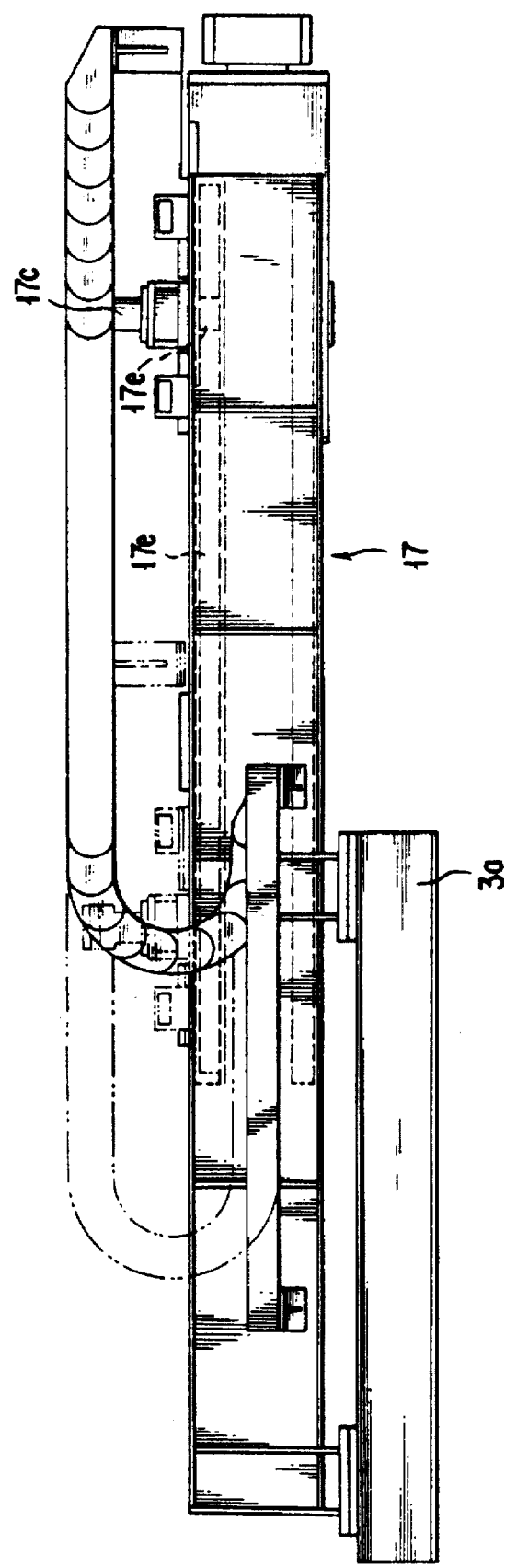
FIG. 10 is an illustration as seen in the direction of arrow F of FIG. 9.
Figure 11:
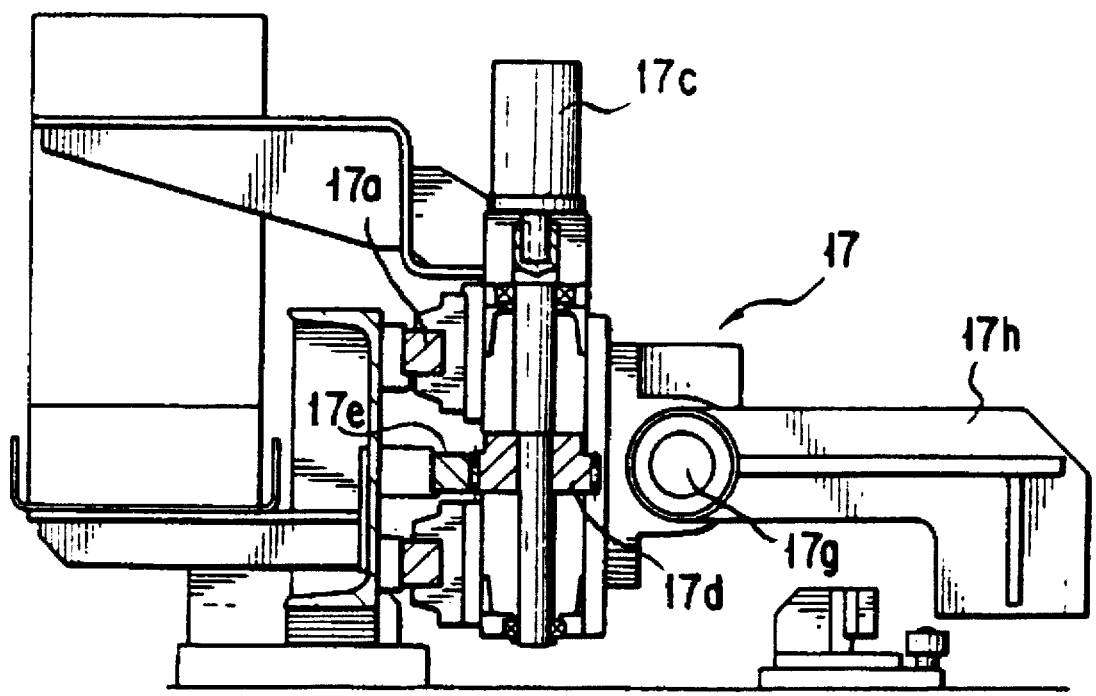
FIG. 11 is a section view taken along line F'—F' of FIG. 9.

On the other hand, the cross pallet shifter 17 is provided at the side portion of the X-Y table 4. The cross pallet shifter 17 is provided with a guide rail 17a extending in a direction parallel to the X-axis direction of the X-Y table 4, as shown in FIGS. 9 through 11. On the guide rail 17a, a movable base 17b is supported in movable fashion.

On the movable base 17b, a traveling motor 17c is mounted. A pinion 17d rotated by the traveling motor 17c is meshed with a rack 17e extending along the guide rail 17a. Therefore, the movable base 17b is driven along the guide rail 17a by the traveling motor 17c.

On the movable base 17b, a rotary shaft 17g is supported along a moving direction by means of a bearing 17f. At the side of one end of the rotary shaft 17g, a claw body 17h is firmly secured. The claw body 17h is designed to pivot from a horizontal position to an upright position by rotating the rotary shaft 17g by a rotary actuator 17i connected to one end of the rotary shaft 17g.

Figure 12:
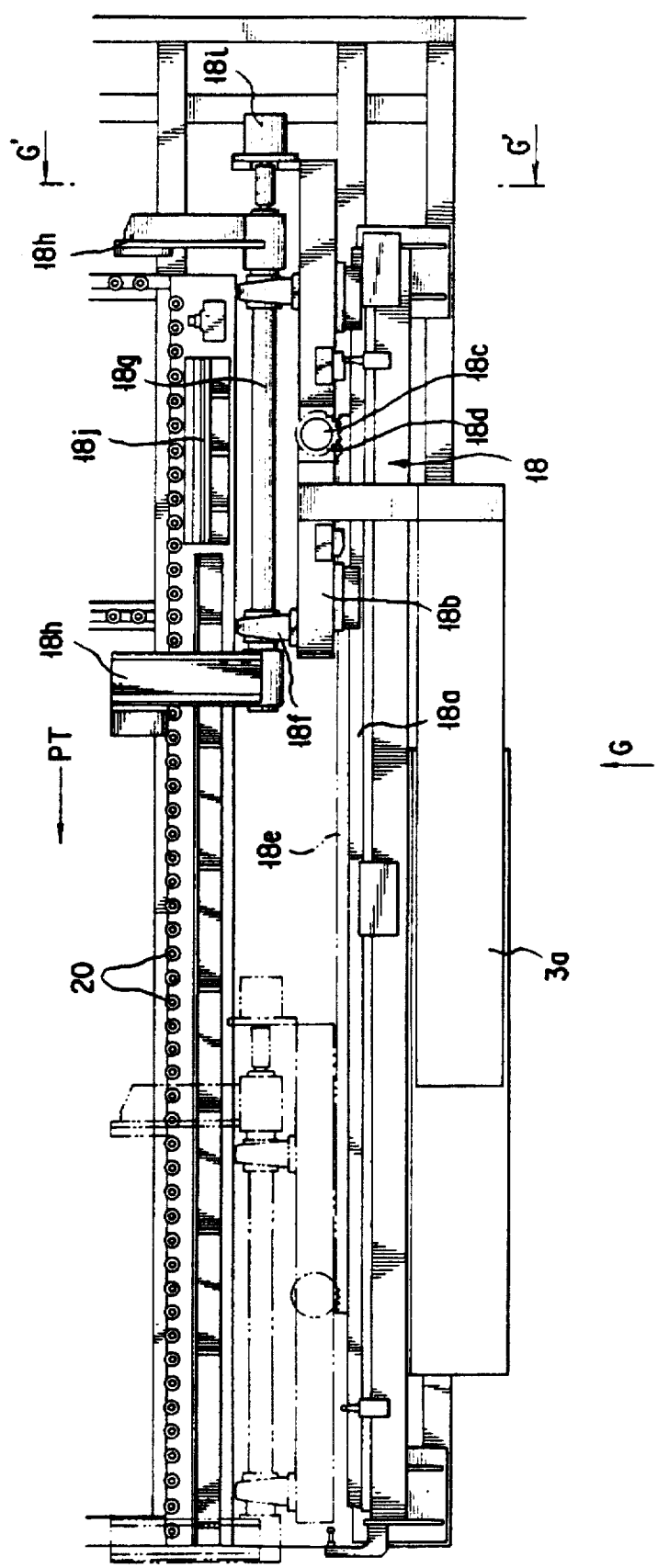
FIG. 12 is a plan view showing an outfeed pallet shifter of one embodiment of the pallet transporting device of the invention.
Figure 13:
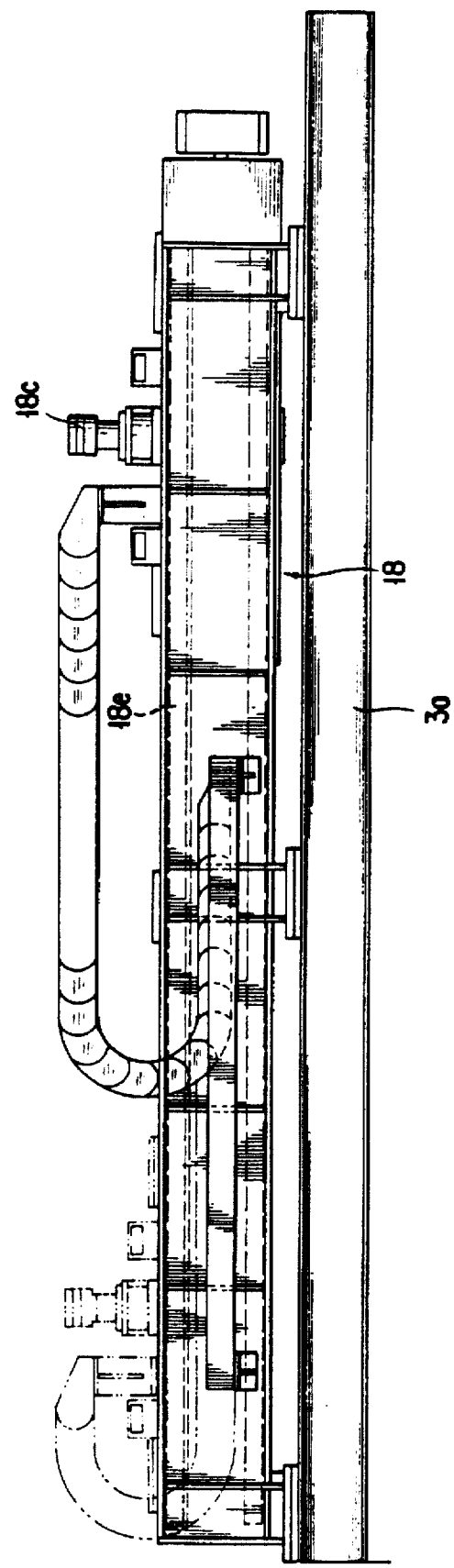
FIG. 13 is an illustration as seen in the direction of arrow G of FIG. 12.
Figure 14:
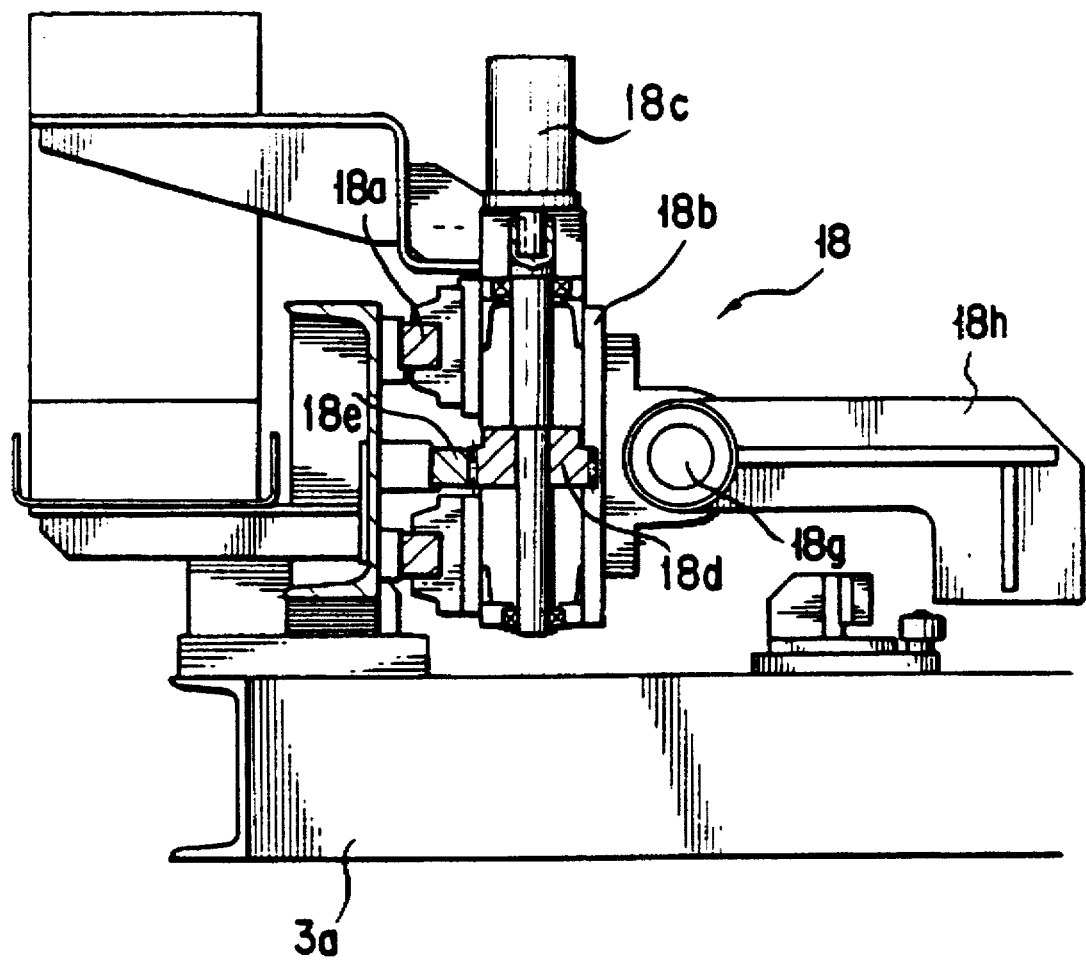
FIG. 14 is a section view taken along line G'—G' of FIG. 12.

On the other hand, the outfeed pallet shifter 18 is located at the side of a roller conveyer 20 provided in parallel to the infeed side of the pallet 2, as shown in FIGS. 12 to 14. A guide rail 18a is provided in a pallet outfeeding direction (arrow PT). On the guide rail 18a, a movable base 18b is movably supported.

On the movable base 18b, a traveling motor 18c is provided. A pinion 18d to be rotatingly driven by the traveling motor 18c is meshed with a rack 18e provided along the guide rail 18a. By the traveling motor 18c, the movable base 18b is driven to move.

On the movable base 18b, a rotary shaft 18g is supported along the moving direction by means of the bearing 18f. At both ends of the rotary shaft 18g, a pair of claw bodies 18h are rigidly secured with an interval slightly greater than the length of one side of the pallet 2. The claw bodies 18h are pivotable from the horizontal position to the upright position by rotating the rotary shaft 18g by a rotary actuator 18i.

It should be noted that, in FIG. 5, 18j denotes a stationary stopper, and 18k denotes a movable stopper which is pivotable by a stopper cylinder 18m.

Figure 15:
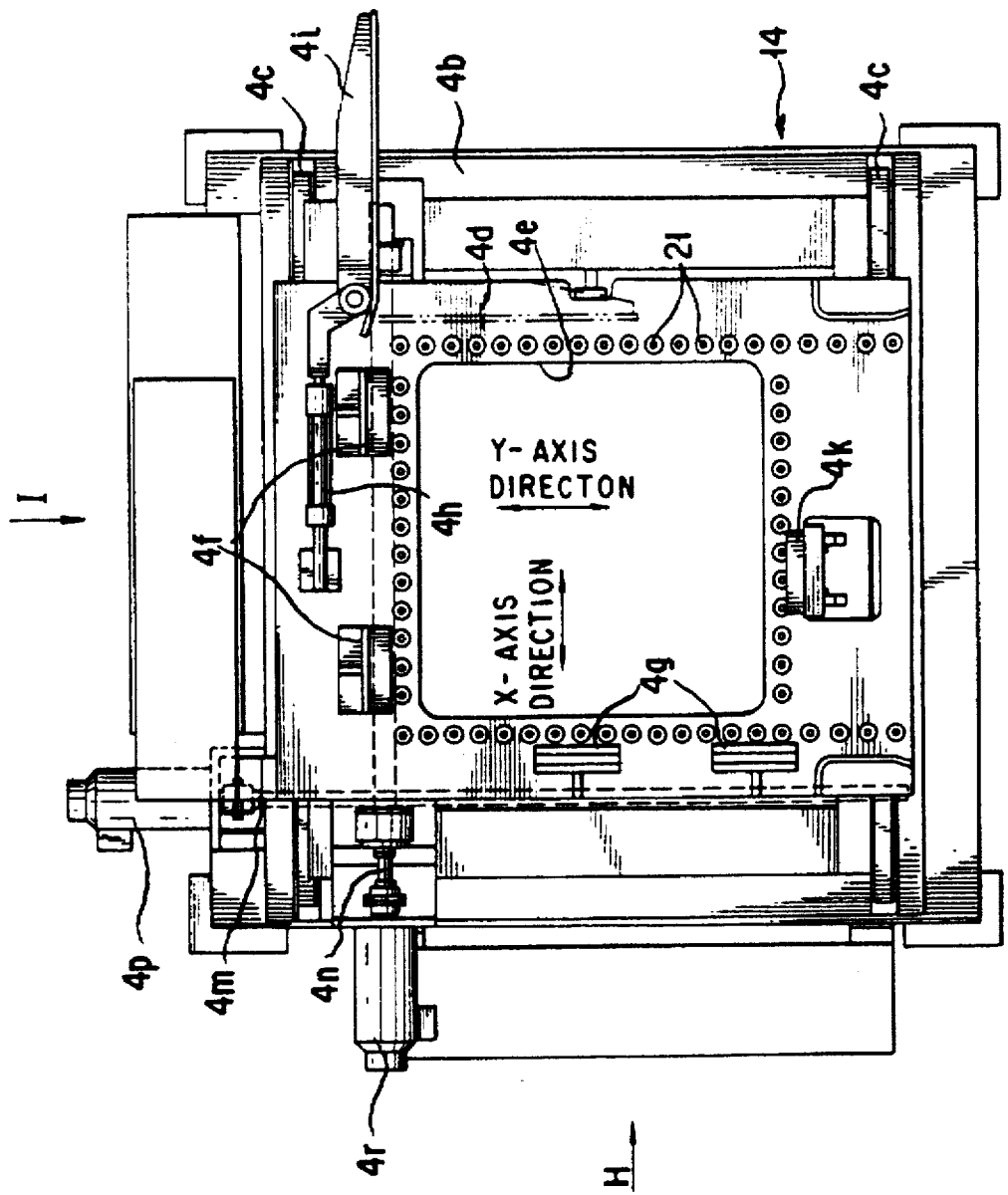
FIG. 15 is a plan view showing an X-Y table of one embodiment of the pallet transporting device of the invention.
Figure 16:
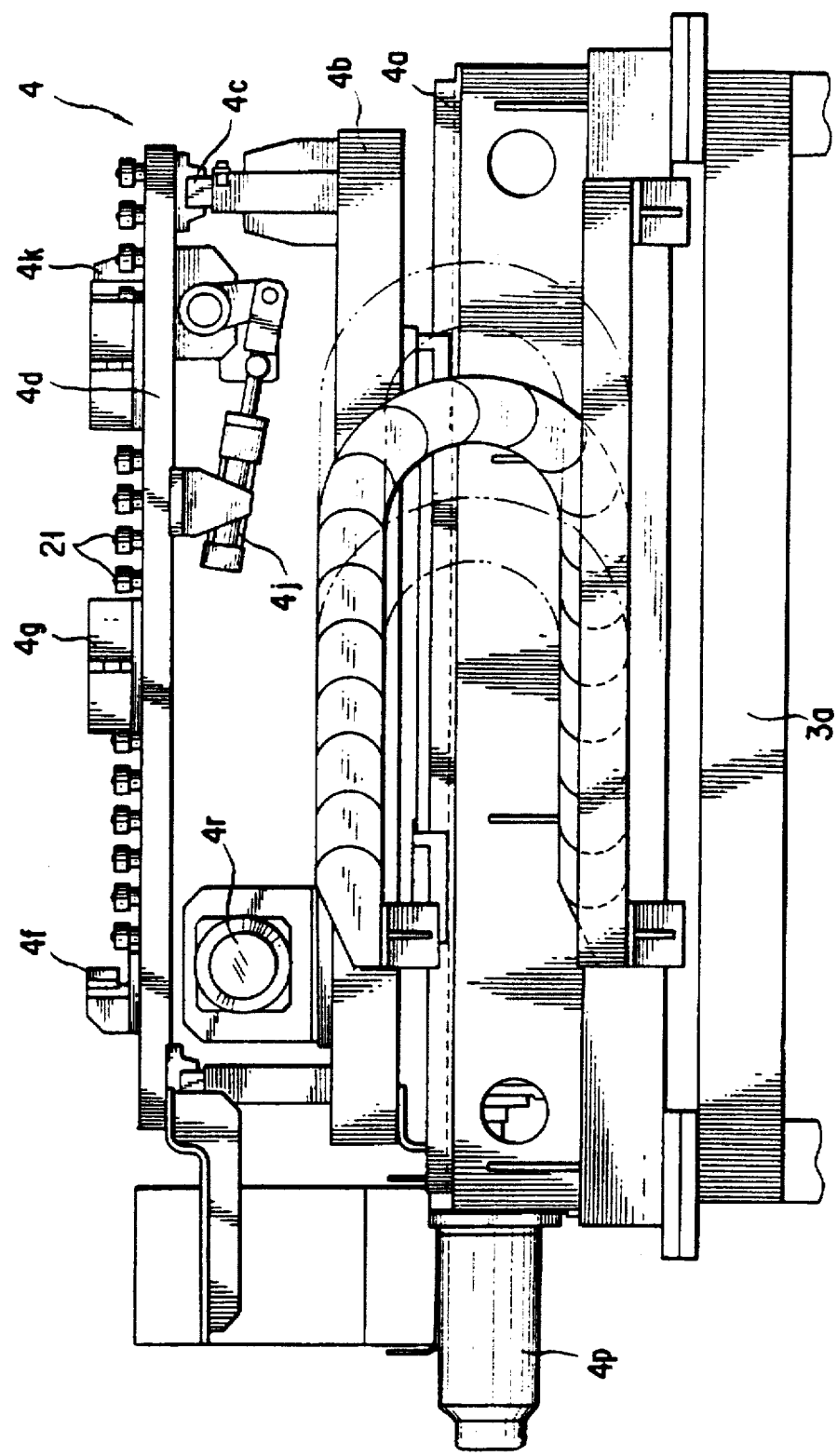
FIG. 16 is an illustration as seen in the direction of arrow H in FIG. 15.
Figure 17:
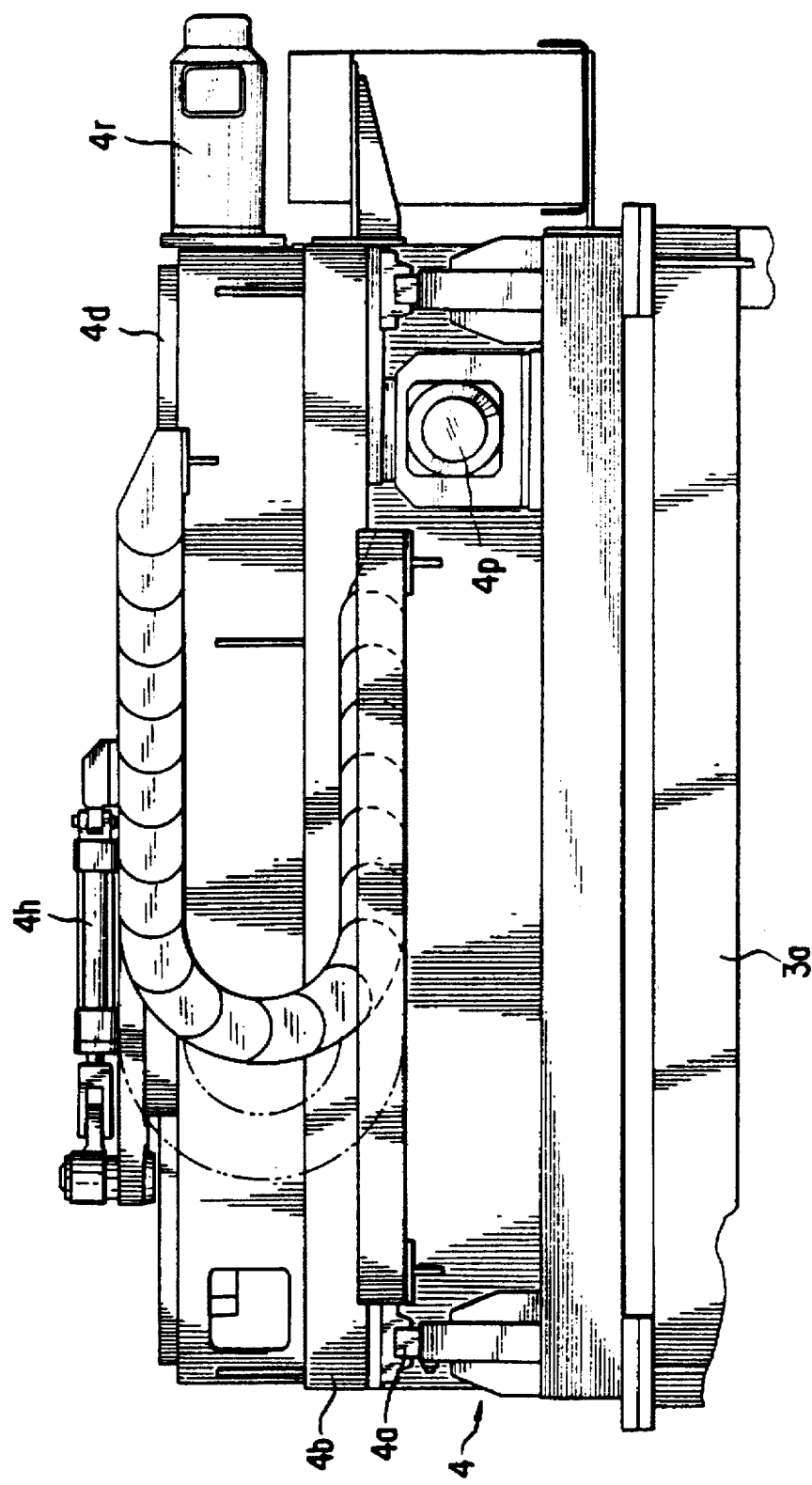
FIG. 17 is an illustration as seen in the direction of arrow I of FIG. 15.

On the other hand, the X-Y table 4 has a Y-axis table 4b movable in the Y-axis direction along a guide rail 4a provided in the Y-axis direction on the platform 3a, as shown in FIGS. 15 to 17. On the Y-axis table 4b, a guide rail 4c is extended in the X-axis direction perpendicular to the Y-axis. An X-axis table 4d is movably supported on the guide rail 4c for movement in the X-axis direction.

The X-axis table 4d is formed into a substantially square configuration slightly greater than the pallet 2. A square hole 4e is formed at the center portion of the X-axis table. Along the peripheral edge of the square hole 4e, a roller conveyer 21 is provided so that the pallet 2 may be movable in the X-axis direction and the Y-axis direction on the X-axis table 4d.

Then, a Y-axis direction stopper 4f for stopping the pallet 2 infed by the infeed pallet shifter 16 at a predetermined position is provided. Also, an X-axis direction stopper 4g is provided in the position perpendicular to the Y-axis direction stopper 4f. At the position opposing to the Y-axis direction stopper 4f, a movable stopper 4k which can be risen and fallen by a stopper cylinder 4f is provided. Also, at a position opposing to the X-axis direction stopper 4g, a movable stopper 4i pivotable in horizontal direction by a stopper cylinder 4h is provided. Therefore, through the operation discussed later, the pallet 2 may be stopped at the predetermined position on the X-axis direction table 4d.

On the other hand, in the vicinity of the guide rail 4a provided in the Y-axis direction and the guide rail 4c provided in the X-axis direction, ball screw shafts 4m and 4n are provided in parallel, respectively.

The ball screw shaft 4m provided in the Y-axis direction is threadingly engaged with a part of the Y-axis direction table 4b. By rotating the ball screw shaft 4m by a Y-axis motor 4p which comprises a servo motor connected to one end of the ball screw shaft 4m, the Y-axis direction table is shifted in the Y-axis direction.

The ball screw shaft 4n provided in the X-axis direction is threadingly engaged with a part of the X-axis direction table 4d. By rotating the ball screw shaft 4n by an X-axis motor 4r connected to one end of the ball screw shaft 4n, the X-axis direction table 4d is shifted in the X-axis direction.

On the other hand, a floater exchanging device 7 provided between the floater rack 5 and the unstacking position A, has a pair of guide rails 7b extending in the X-axis direction on a base 7a provided above the unstacking position A. On these guide rails 7b, a shuttle 7c, on which two magnetic floaters 6 can be mounted, are supported in movable fashion.

On one end side of the shuttle 7c, a floater $6_1$ for a circular material for separating a circular sheet stack 1 from the pallet 2 is preliminarily secured. At the other end side of the shuttle, a floater $6_2$ for a deformed (i.e., irregularly shaped) material, stored in the floater rack 5 can be installed in exchangeable fashion.

Figure 18:
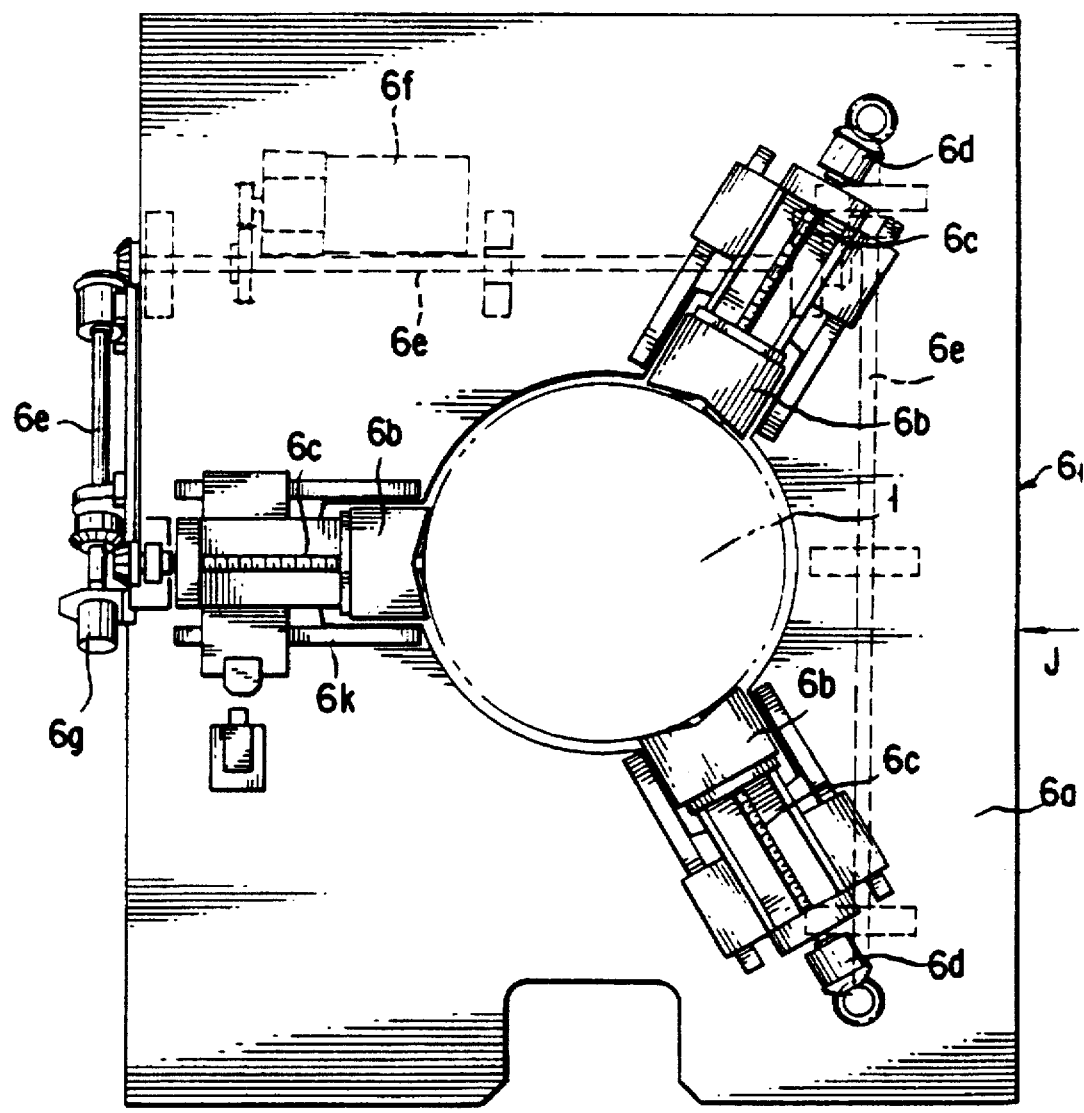
FIG. 18 is a plan view of a floater for a circular material, in one embodiment of the unstacking feeder according to the invention.
Figure 19:
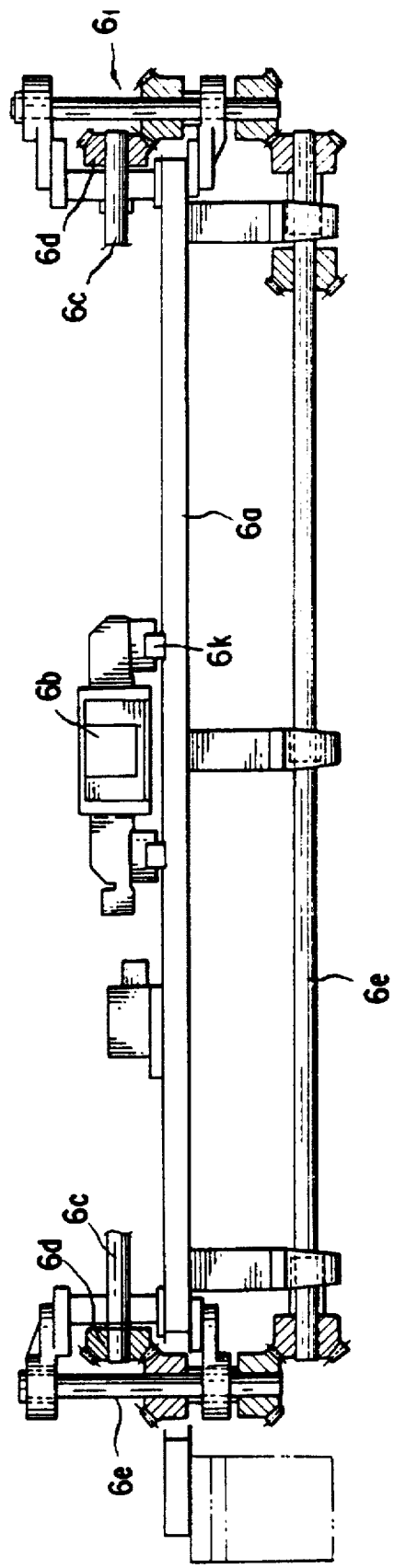
FIG. 19 is an illustration as seen in the direction of arrow J in FIG. 18.

The floater $6_1$ for the circular material has a mounting portion for the sheet stack 1 on a floater base 6a, as shown in FIGS. 18 and 19. On the circumference of the mounting portion, three floater members 6b which comprise magnets, are provided.

The surfaces of the floater members 6b mating with the sheet stack 1 are recessed in substantially V-shaped configuration. On the opposite side surfaces of the floater members, screw shafts 6c are threadingly engaged.

Respective screw shafts 6c are connected to a motor 6f via a bevel gear 6d and a connecting shaft 6e. By rotatingly driving respective screw shafts 6c by the motor 6f, respective floater members 6b are shifted in the diametrical direction of the sheet stack 1 as guided by guide rails 6k for adjustment. The adjusted position is detected by an encoder 6g connected to the connecting shaft 6e.

Figure 20:
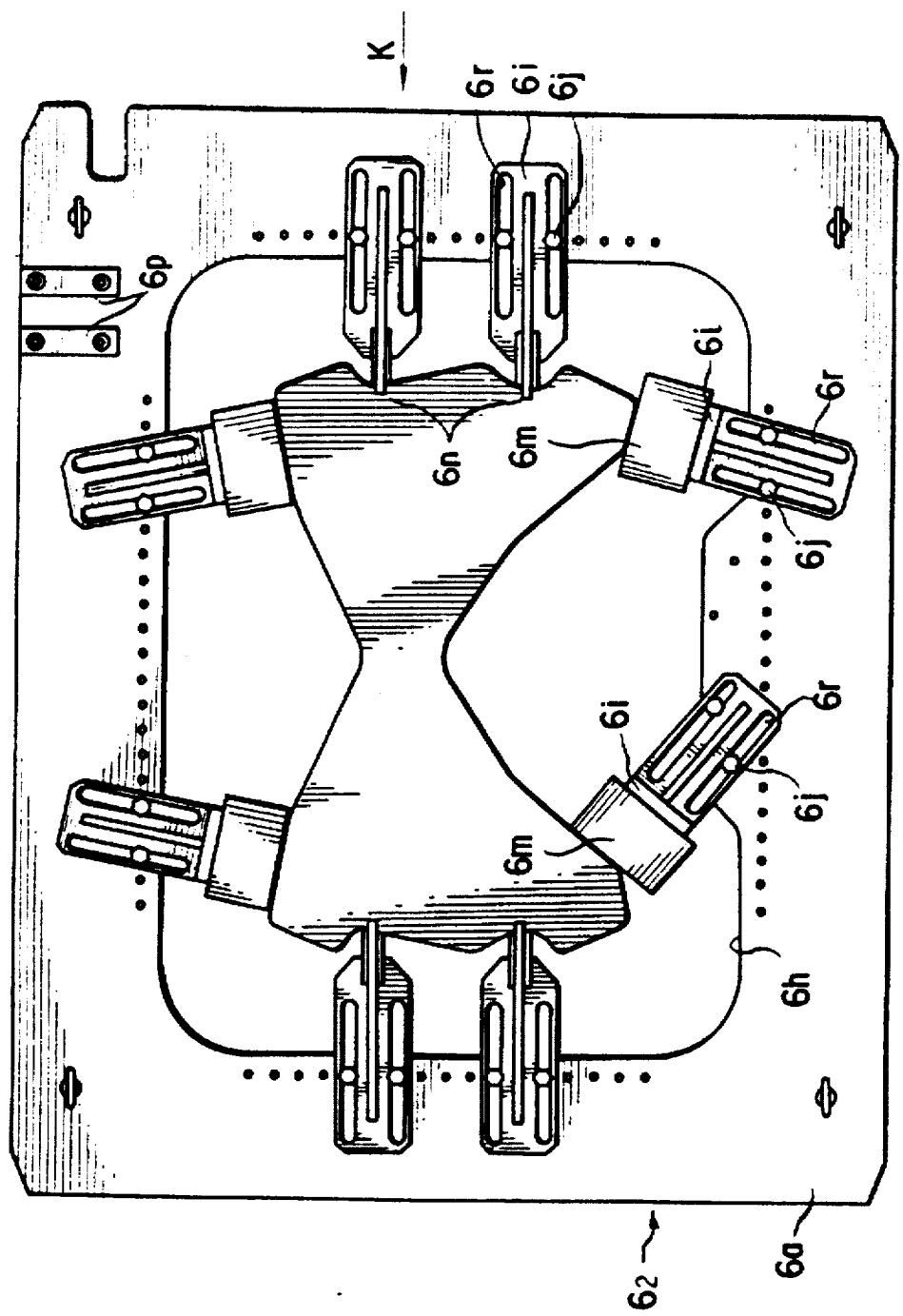
FIG. 20 is a plan view showing a floater for a deformed material, in one embodiment of the unstacking feeder according to the invention.
Figure 21:
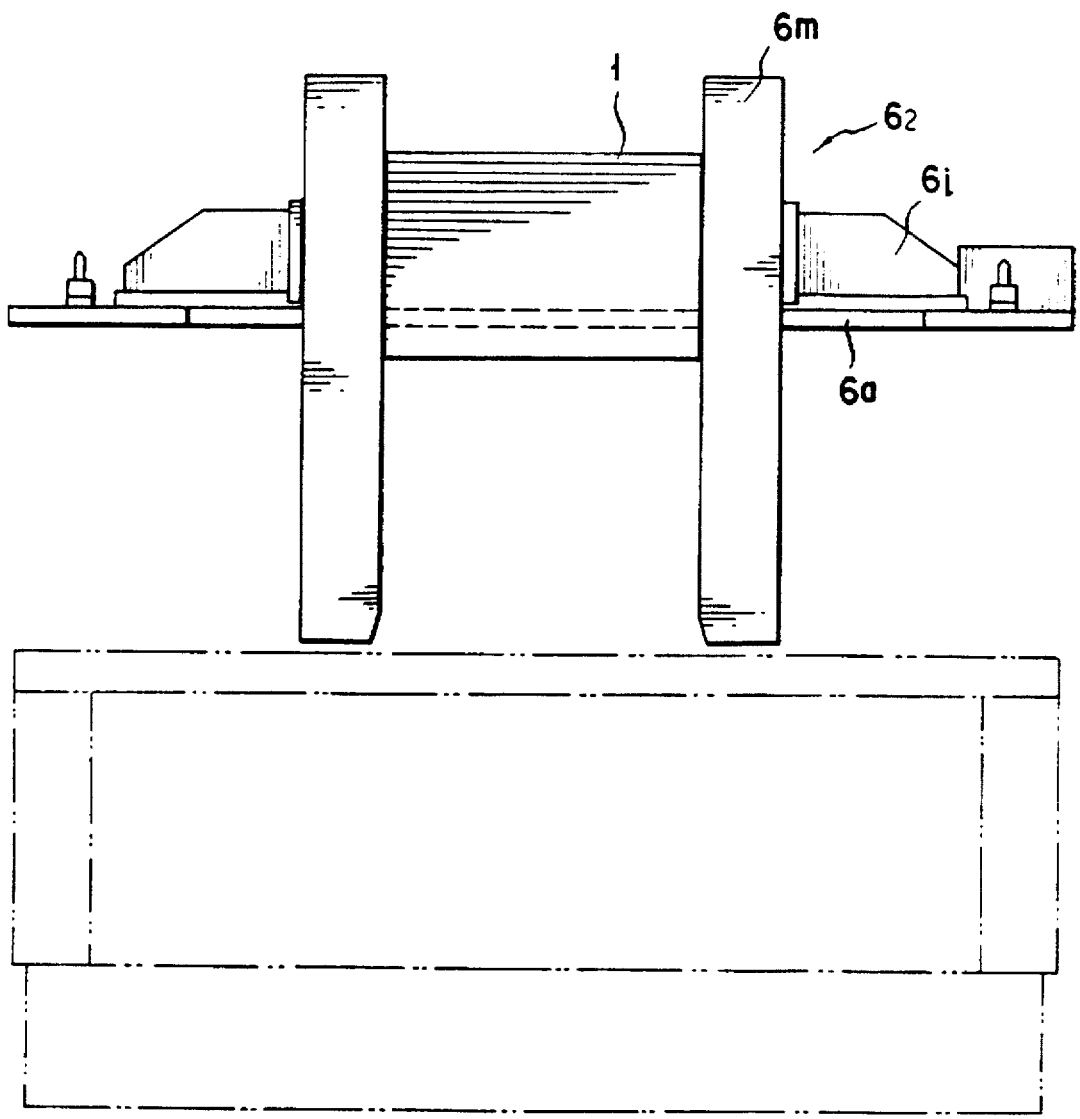
FIG. 21 is an illustration as seen in the direction of arrow K in FIG. 20.
Figure 22:
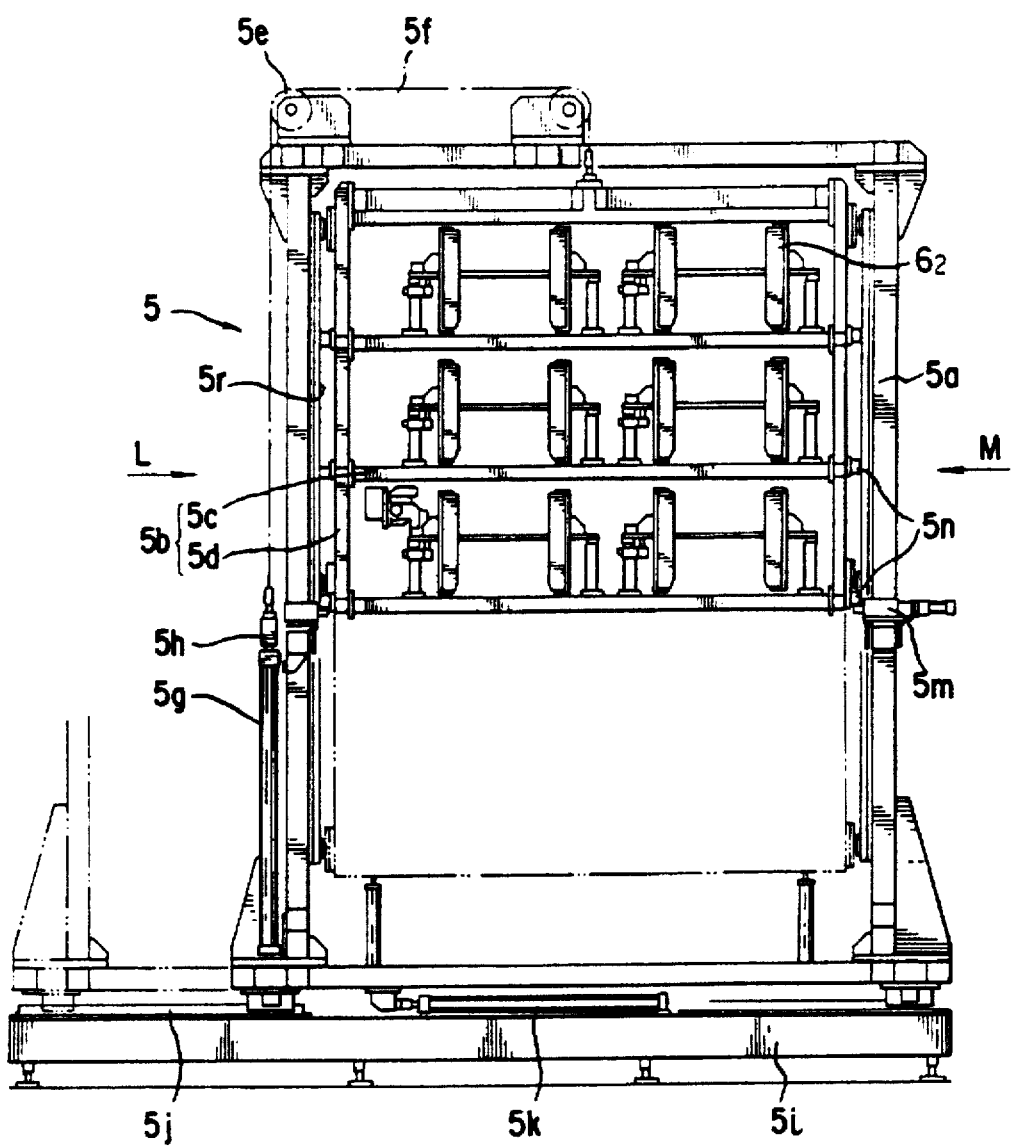
FIG. 22 is a front elevation showing a floater rack of one embodiment of the unstacking feeder according to the invention.
Figure 23:
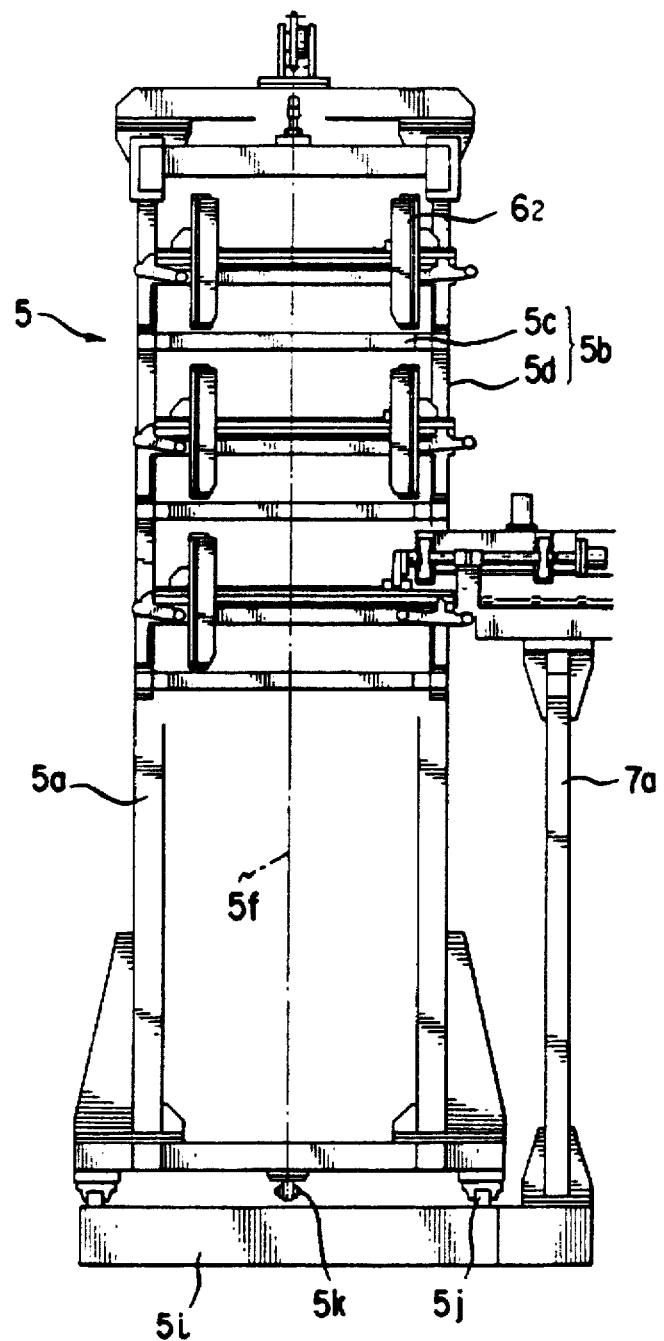
FIG. 23 is an illustration as seen in the direction of arrow L in FIG. 22.
Figure 24:
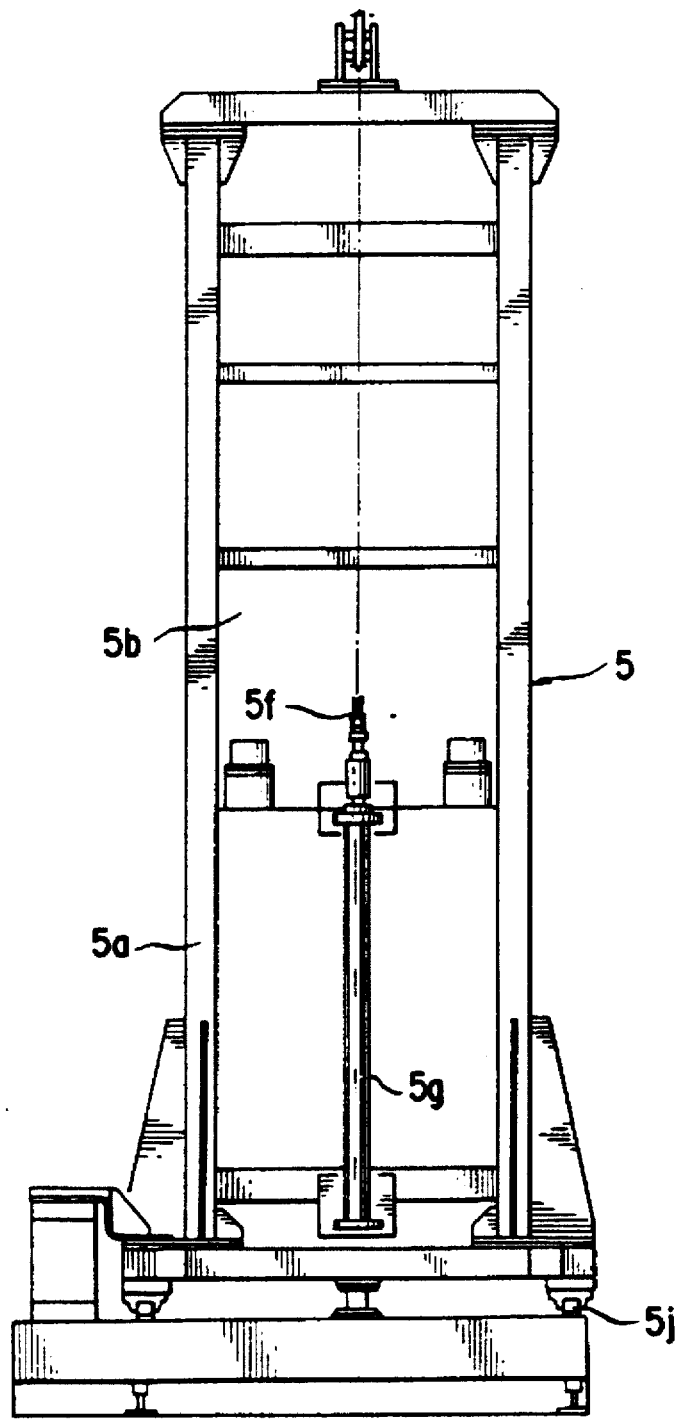
FIG. 24 is an illustration as seen in the direction of arrow M in FIG. 22.

On the other hand, six floaters $6_2$ for the deformed material are preliminarily provided, for example, and constructed as shown in FIGS. 20 and 21.

Namely, at the center portion of the floater base 6a having the same size to the floater base 6a for the floater $6_1$ for the circular material, a square hole 6h is opened. On the circumference of the square hole 6h, eight brackets 6i having a pair of elongated holes 6f are mounted for shifting adjustment by an adjusting screw 6j.

On these brackets 6i, four floater members 6m are mounted, and on remaining brackets 6i, positioning members 6n are mounted.

On the other hand, the floater rack 5 storing the floater $6_2$ for the deformed material has shelf assemblies 5b, each storing two floaters $6_2$, in respective shelves 5c, as shown in FIGS. 22 to 25.

The shelf assembly 5b is constructed by three stages of shelves 5c and vertical frames connecting the shelves 5c. On both sides of a rack body 5a, guide rails 5r extending in the vertical direction are supported. One end of a chain 5f wound around a sprocket 5e provided at the upper portion of the rack body 5a is connected to the top portion of the shelf assembly 5b.

The other end of the chain 5f is connected to the tip end of a piston rod 5h of a lift cylinder 5g which is fixed to the lower side surface of the rack body 5a. By the lift cylinder 5g, the shelf assembly 5b is moved vertically along the guide rail 5d via the chain 5f.

On the other hand, the rack body 5a is mounted on rails 5j provided on a base 5i and is movable in the Y-axis direction perpendicular to the moving direction of the shuttle 7c. On both sides of the rack body 5a, stopper cylinders 5m for stopping the selected shelf 5c of the shelf assembly 5b at the same height to the shuttle 7c are provided. These stopper cylinders 5m are engaged with stoppers 5n projecting from respective shelves 5c at both sides of the shelf assembly 5b.

On the other hand, the floater exchanging device 7 comprises a shuttle 7c moving with and carrying the magnetic floater 6, and a floater transferring mechanism 7d which mounts the floater $6_2$ for the deformed material in the floater rack 5 on the shuttle 7c and storing the used floater $6_2$ for the deformed material in the predetermined shelf 5c.

Figure 28:
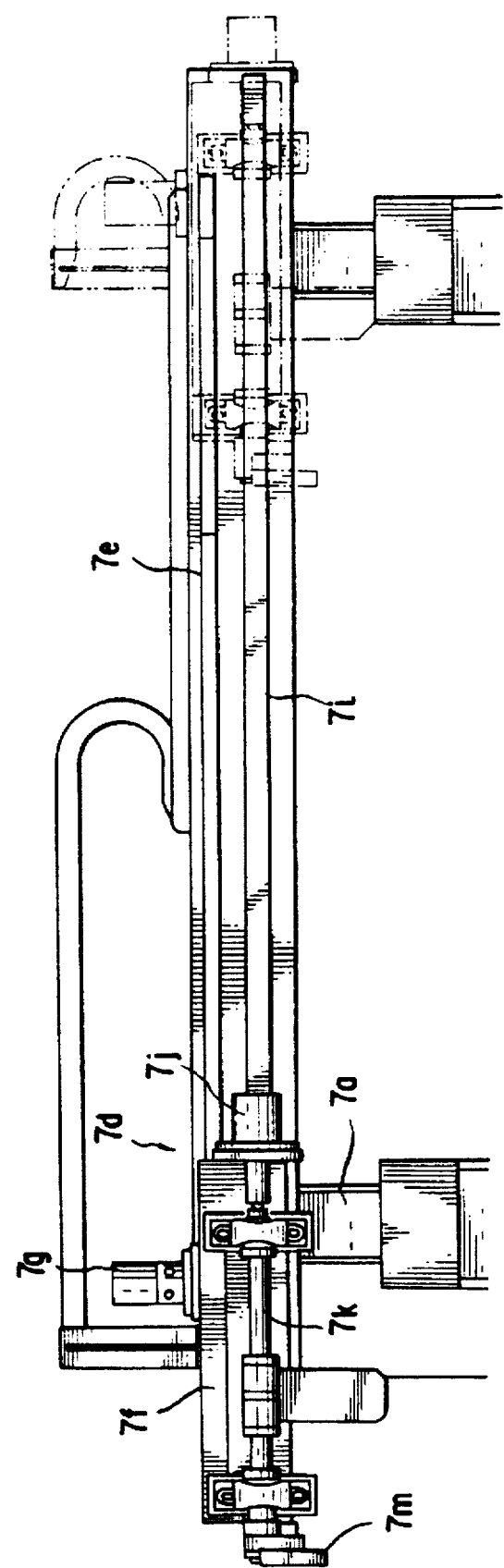
FIG. 28 is an illustration as seen in the direction of arrow O in FIG. 27.
Figure 29:
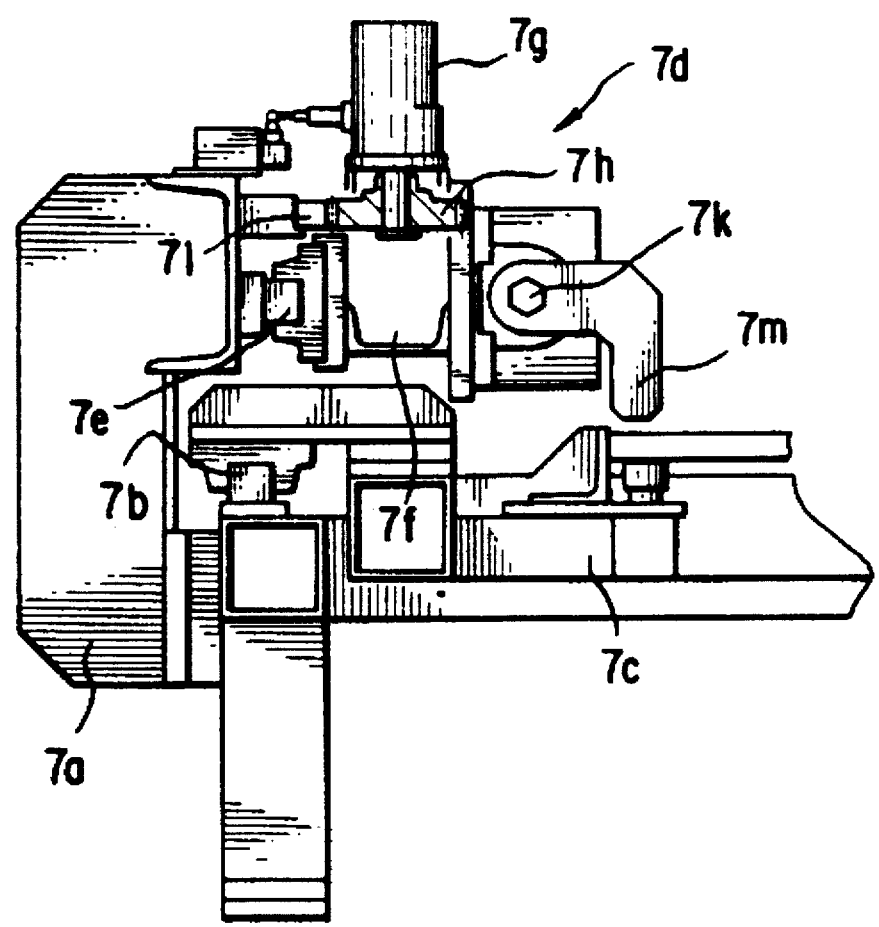
FIG. 29 is an illustration as seen in the direction of arrow P in FIG. 27.

The floater transfer mechanism 7d has guide rails 7e extending along a moving direction of the shuttle 7c on the base 7a, as shown in FIGS. 28 and 29. A movable base 7f is supported on the guide rail 7e. A traveling motor 7g is mounted on the movable base 7f.

A pinion 7h driven to rotate by the traveling motor 7g is meshed with a rack 7i provided along the guide rail 7e. Thus, the traveling motor 7g drives the pinion 7h to rotate to move the movable base 7f along the guide rail 7e. On the movable base 7f, a rotary shaft 7k is provided which is rotated about 90° by a rotary actuator 7j.

A claw body 7m is provided on the rotary shaft 7k. The claw body 7m can be releasably engaged to an engaging portion 6p provided on the upper surface of the floater base 6a of the floater $6_2$ for the deformed material.

Figure 25:
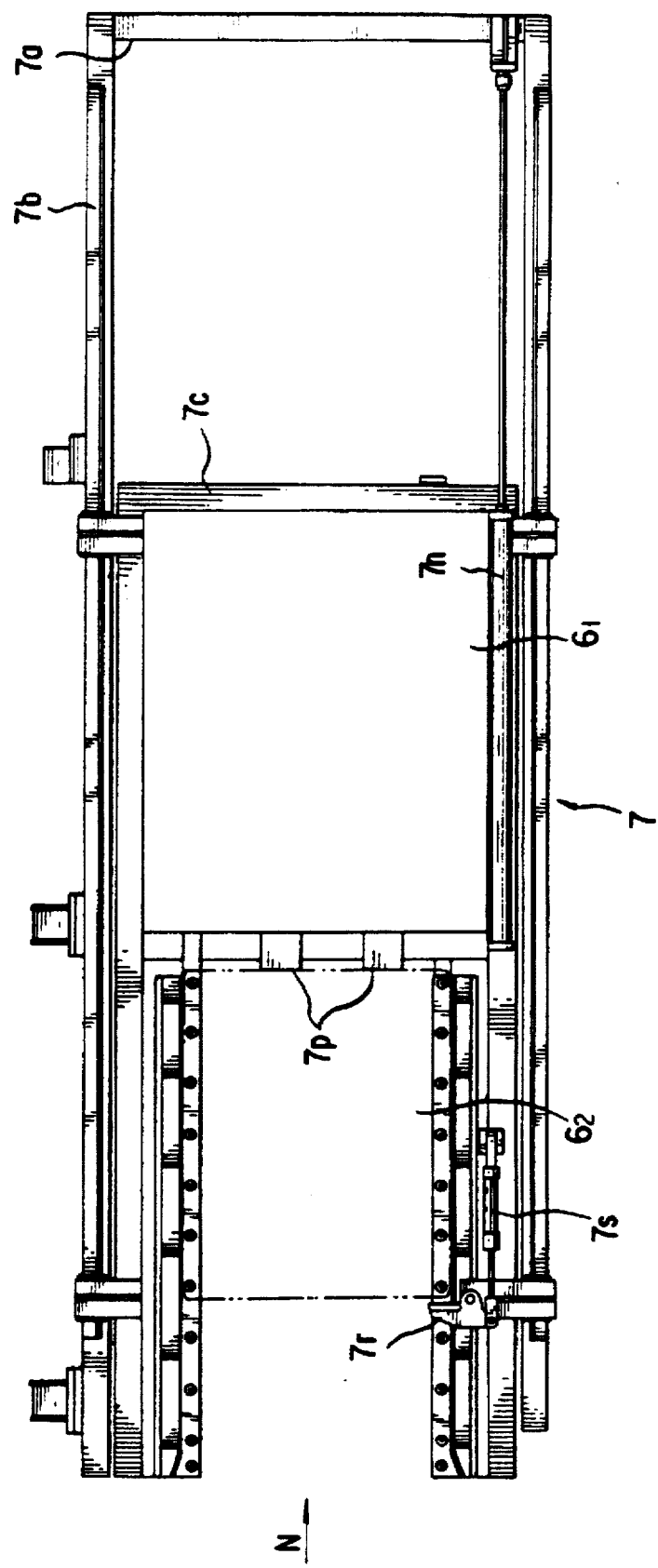
FIG. 25 is a plan view of a floater exchanging device of one embodiment of the unstacking feeder of the invention.
Figure 26:
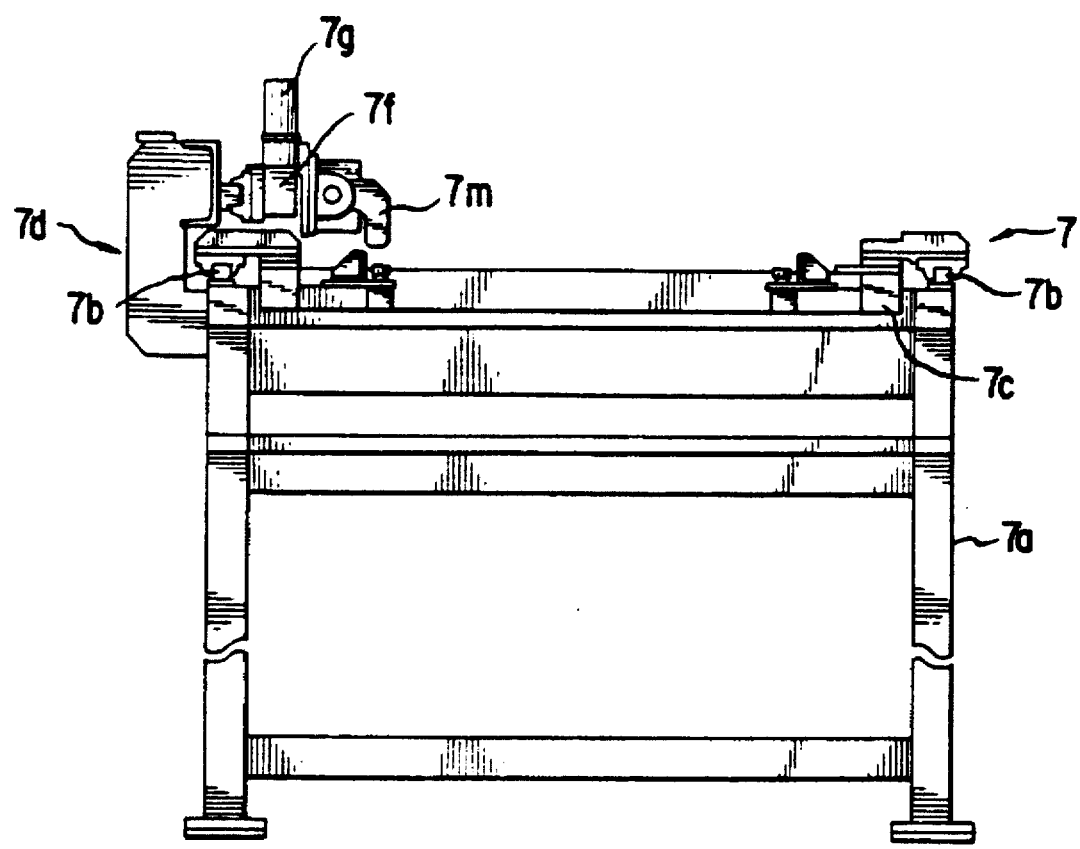
FIG. 26 is an illustration as seen in the direction of arrow N in FIG. 25.
Figure 27:
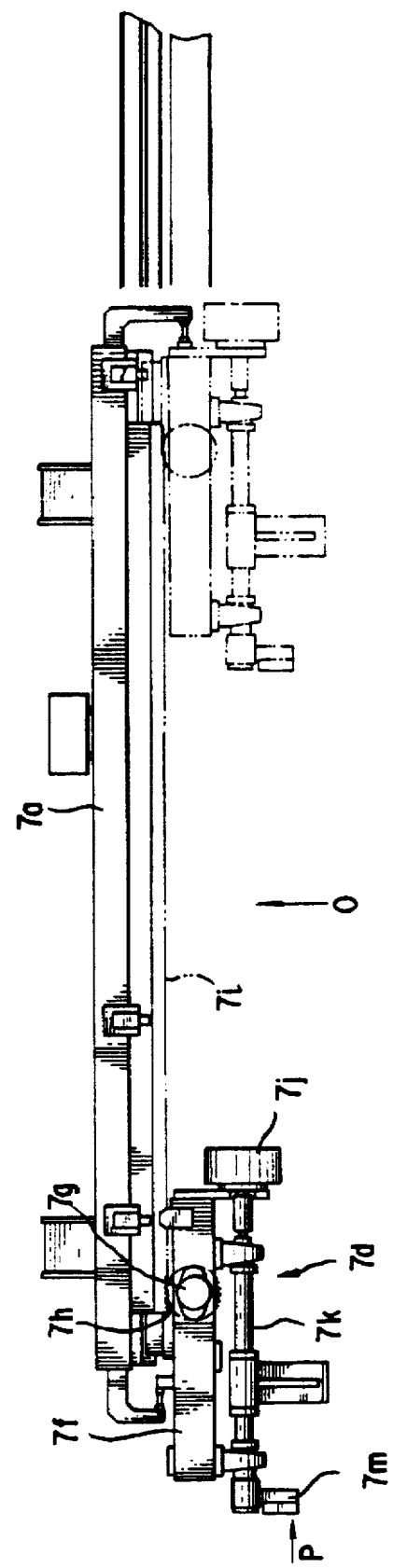
FIG. 27 is a plan view of a floater transferring mechanism of one embodiment of the unstacking feeder of the invention.

On the other hand, the shuttle 7c is movable in the X-axis direction by means of a long stroke shuttle driving cylinder 7n which is provided at one side of the base 7a, as shown FIG. 25. Also, on the shuttle 7c, a stationary stopper 7p and a movable stopper 7r are provided for fixing the picked-up floater $6_2$ for the deformed material, on the shuttle 7c.

The movable stopper 7r is pivotable by a stopper cylinder 7s so that it may be retracted at a position not interfering with the floater $6_2$ for the deformed material when the floater $6_2$ is transferred.

Figure 30:
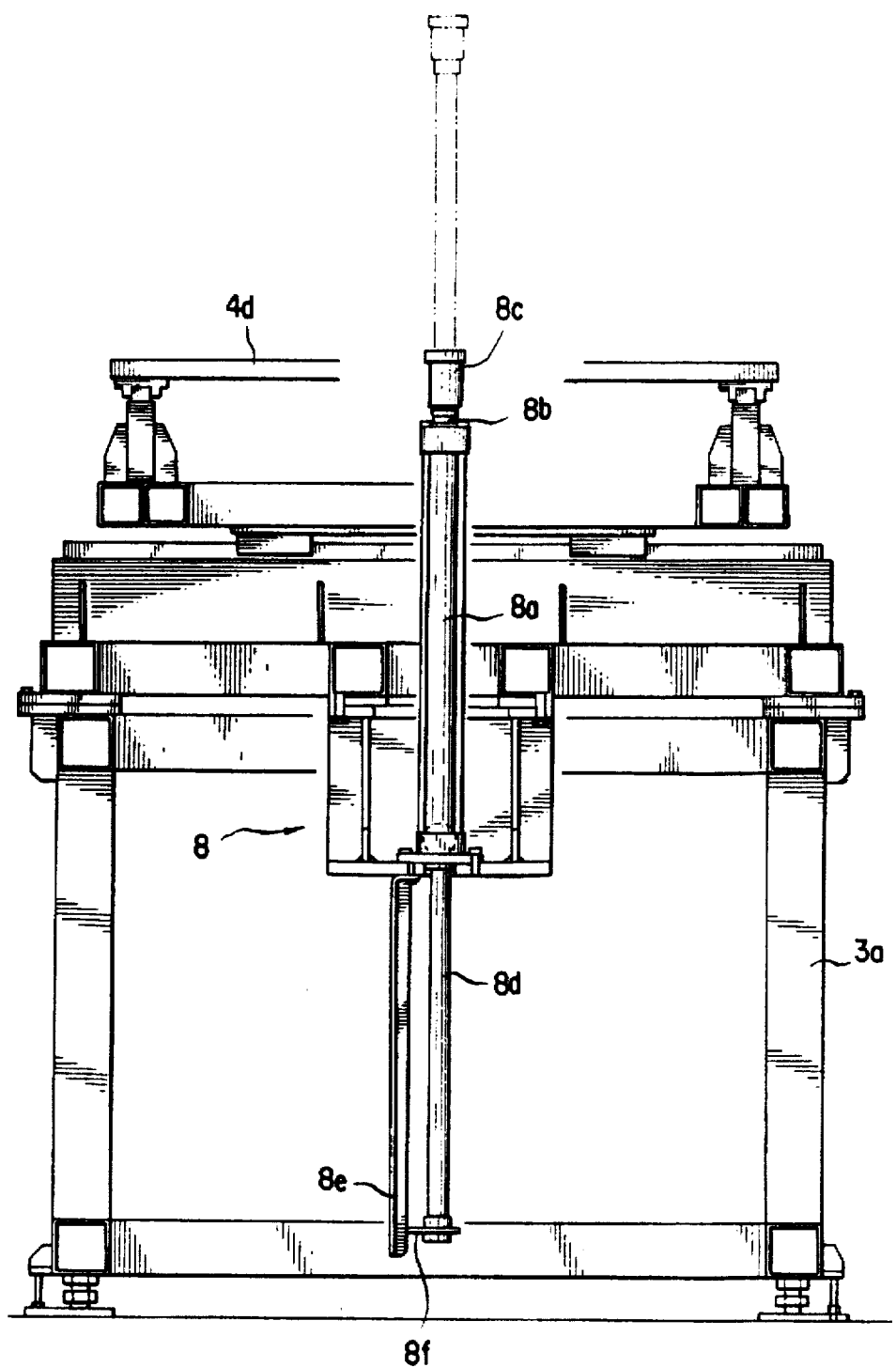
FIG. 30 is a front elevation of a stack lifter of one embodiment of the unstacking feeder of the invention.

On the other hand, the stack lifter 8 provided at the unstacking position A includes lift cylinders 8a comprising both rod cylinders fixedly secured on the platform 3a in a substantially upright fashion, as shown in FIG. 30.

The lift cylinder 8a is placed at the unstacking point a and is provided with a receptacle seat 8c at the tip end of a piston rod 8b projected upwardly, for downwardly depressing the sheet stack 1 on the pallet 2. On the other hand, a variable portion 8f of a stroke detector 8e is mounted on the tip end of the piston rod 8d extending downwardly. By the stroke detector 8e, a lifting height of the sheet stack 1 can be detected.

On the other hand, a vacuum lifter 9 provided above the unstacking position A has a plurality of lift cylinders 9a to be used selectively depending upon the size of the sheet material 1a. Vacuum cups 9c are mounted on the tip ends of the piston rods 9b extending downwardly from these lift cylinders 9a, for attracting the sheet material 1a.

The sheet material 1a attracted to the vacuum lifter 9 is transported to a skid lifter 10 by a magnetic conveyer 11.

Figure 31:
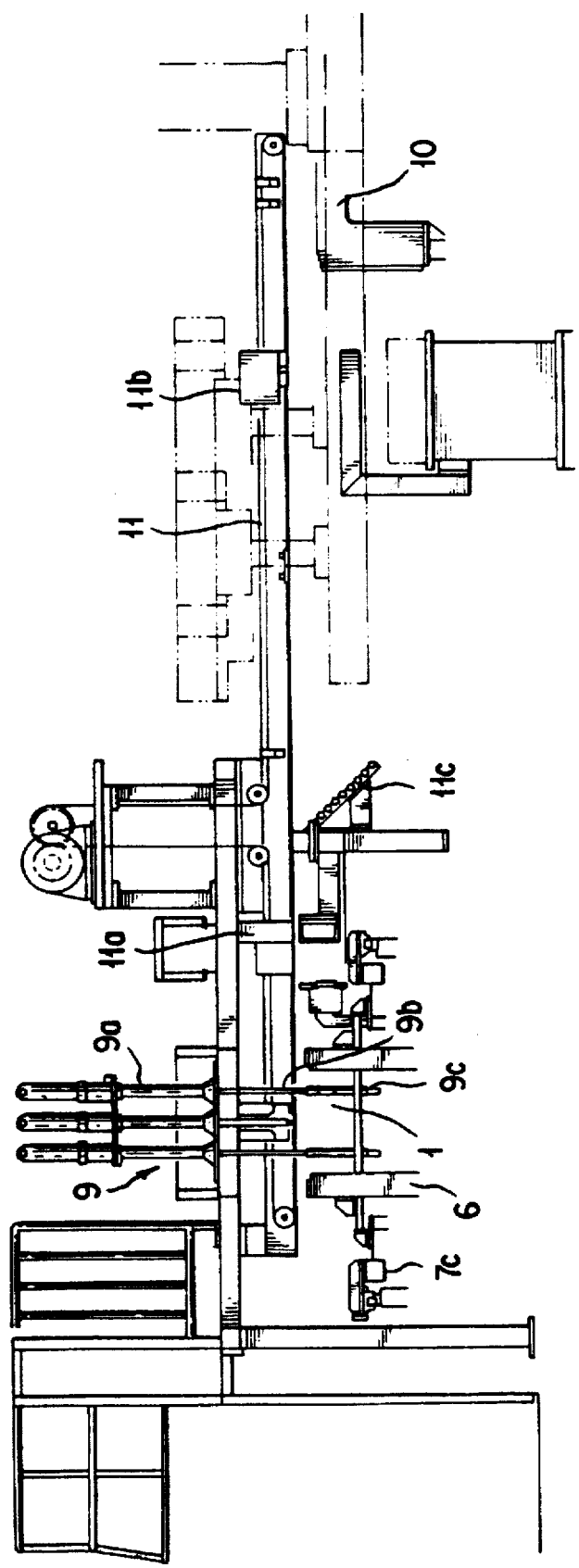
FIG. 31 is a side elevation showing a portion near a magnetic conveyer of one embodiment of the unstacking feeder of the invention.

The magnetic conveyer 11 is provided with double blank detectors 11a, 11b at intermediate two portions, for preventing double feeding of the sheet material 1a, as shown in FIG. 31. When the first double blank detector 11a detects the double blank, this double blank is fallen down through a shoot 11c to continue transportation of the sheet material 1a. When the double blank is transferred to the second double blank detector 11b due to failure or detection error of the first double blank detector 11a and is detected at the second double blank detector 11b, transportation of the sheet material 1a is interrupted.

Figure 32:
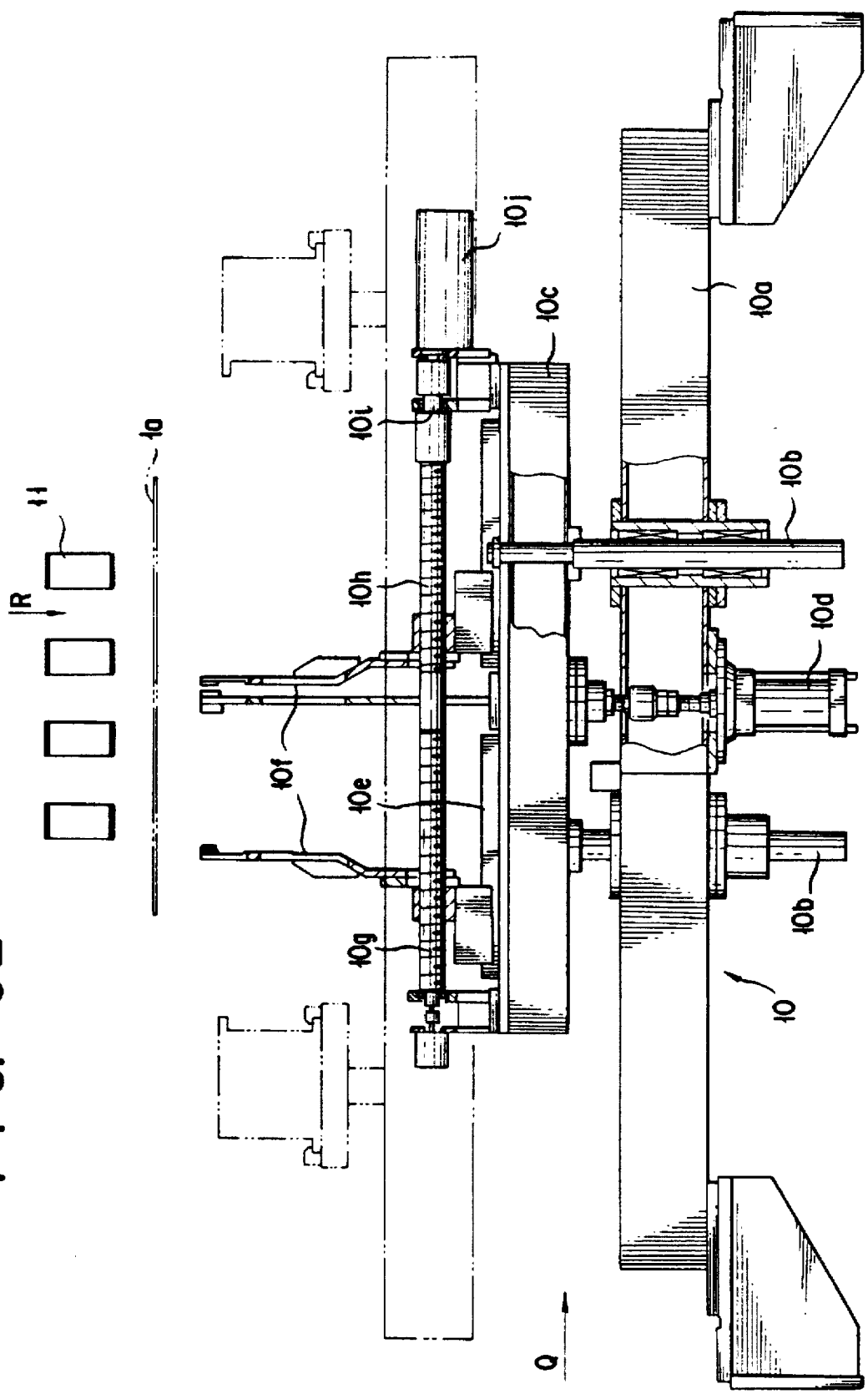
FIG. 32 is a front elevation of a skid lifter of one embodiment of the unstacking feeder of the invention.
Figure 33:
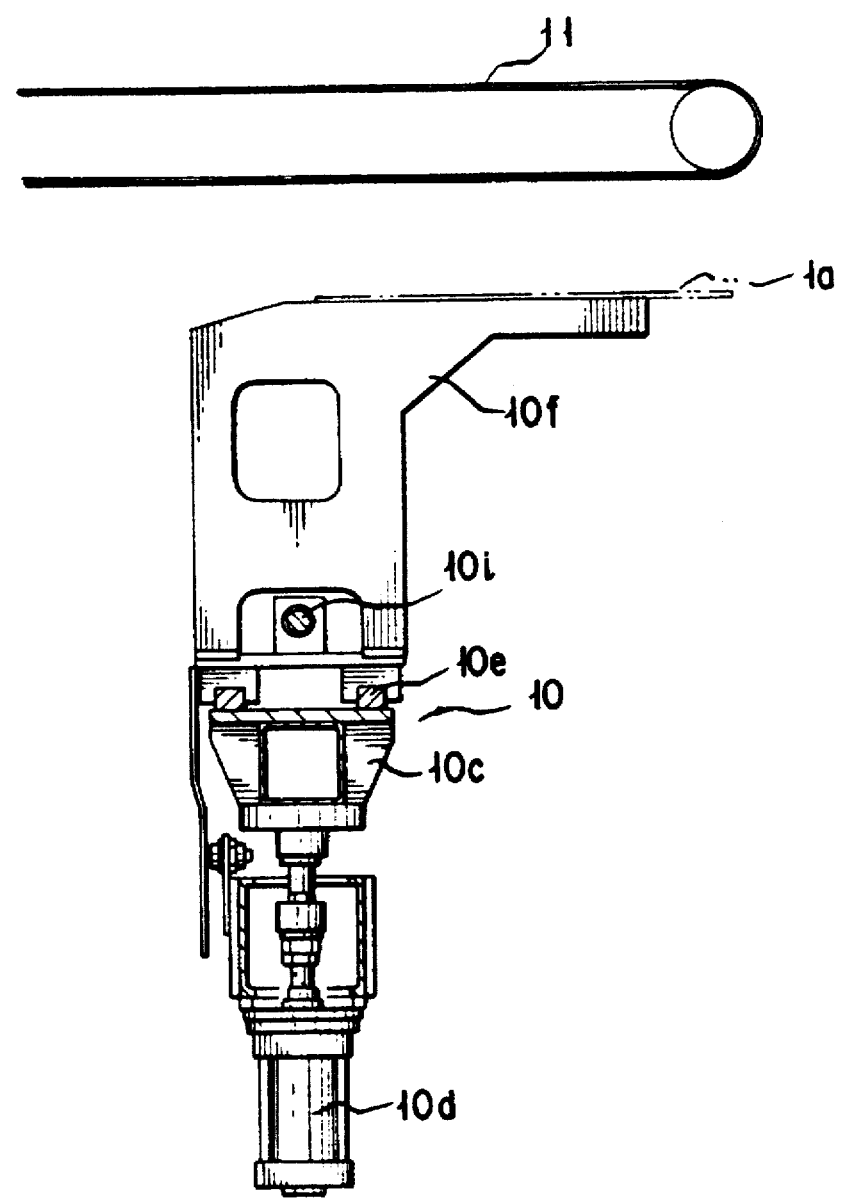
FIG. 33 is an illustration as seen in the direction of arrow Q in FIG. 32.
Figure 34:
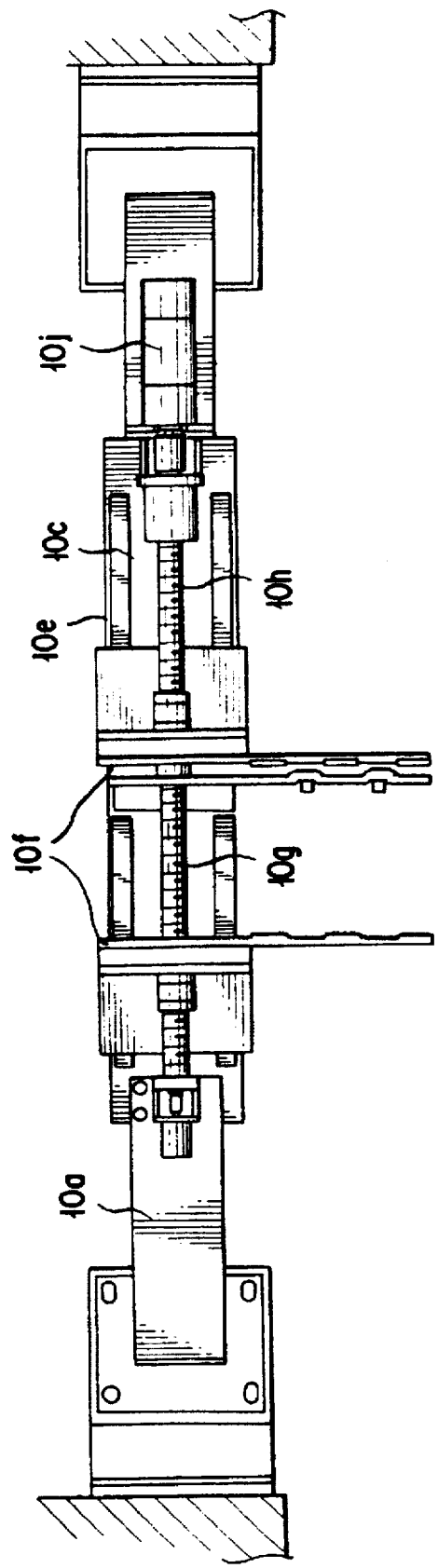
FIG. 34 is an illustration as seen in the direction of arrow R in FIG. 32

On the other hand, a skid lifter 10 for being temporarily mounted with the sheet material 1a transported by the magnetic conveyer 11, has a lift table 10c guided vertically by guide posts 10b on the base 10a, as shown in FIGS. 32 to 34. The lift table 10c is vertically movable by a lift cylinder 10d.

On the lift table 10c, a guide rail 10e is extended perpendicular to the transporting direction of the sheet material 1a. The guide rail 10e movably supports a plurality of skids 10f.

The skids 10f engage with respective threaded portions 10g and 10h of a screw shaft 10i having threaded portions 10g and 10h which are threaded in mutually opposite directions. Thus, the interval of the skids 10f can be adjusted depending upon the size of the sheet material 1a by rotating the screw shaft 10i by a rotary actuator 10j.

Figure 35:
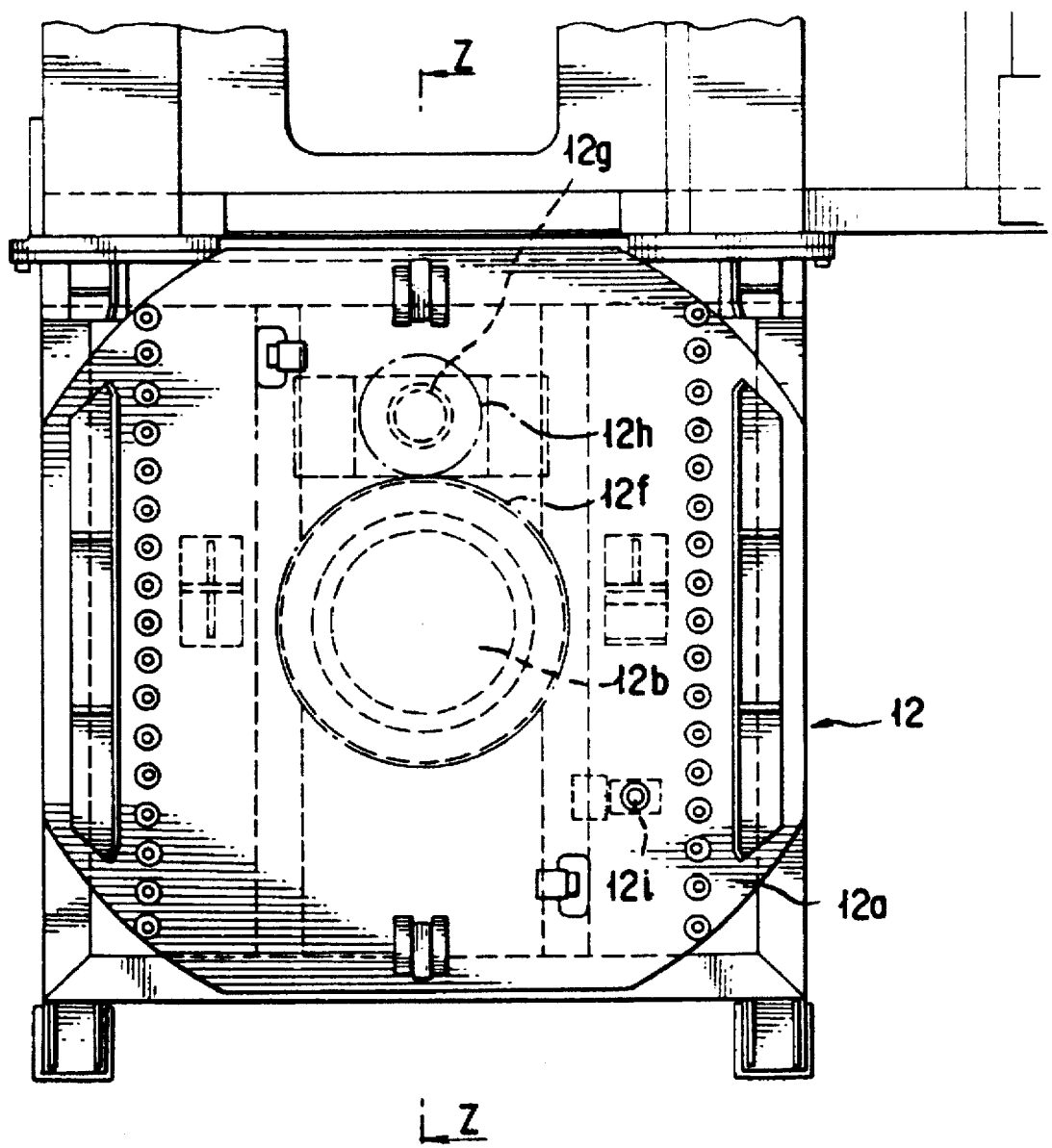
FIG. 35 is a plan view showing a pallet reversing device of one embodiment of the unstacking feeder according to the invention.
Figure 36:
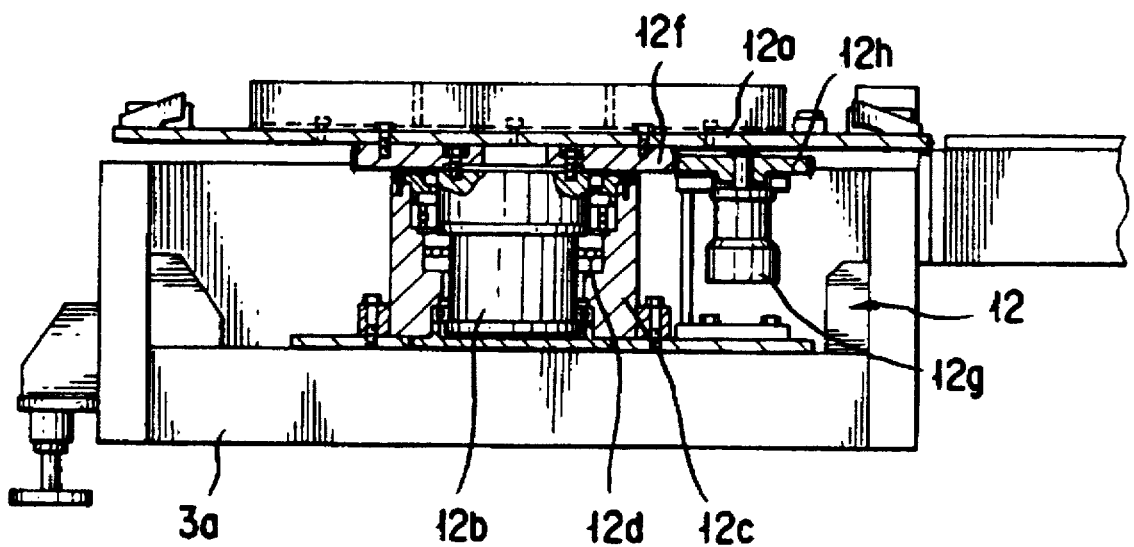
FIG. 36 is a section view taken along line Z—Z of FIG. 35.

On the other hand, the pallet reversing device 12 provided at the pallet outfeeding side of the pallet transporting device 3 has a turn table 12a to mount the pallet 2, as shown in FIGS. 35 and 36.

At the center portion of the lower surface of the turn table 12a, a support shaft 12b is extended. The support shaft 12b is rotatably supported on a support member 12c fixed to the platform 3a, via a bearing 12d.

Between the upper ends of the turn table 12a and the support shaft 12b, a gear 12f is interposed. A gear 12h driven to rotate by a turning motor 12g is meshed with the gear 12f so that the turn table 12a may rotate over approximately 180° in forward and reverse directions, about the support shaft 12b by the turning motor 12g.

It should be noted that, in FIG. 35, 12i denotes a position detector for detecting a rotational position of the turn table 12a.

Figure 37:
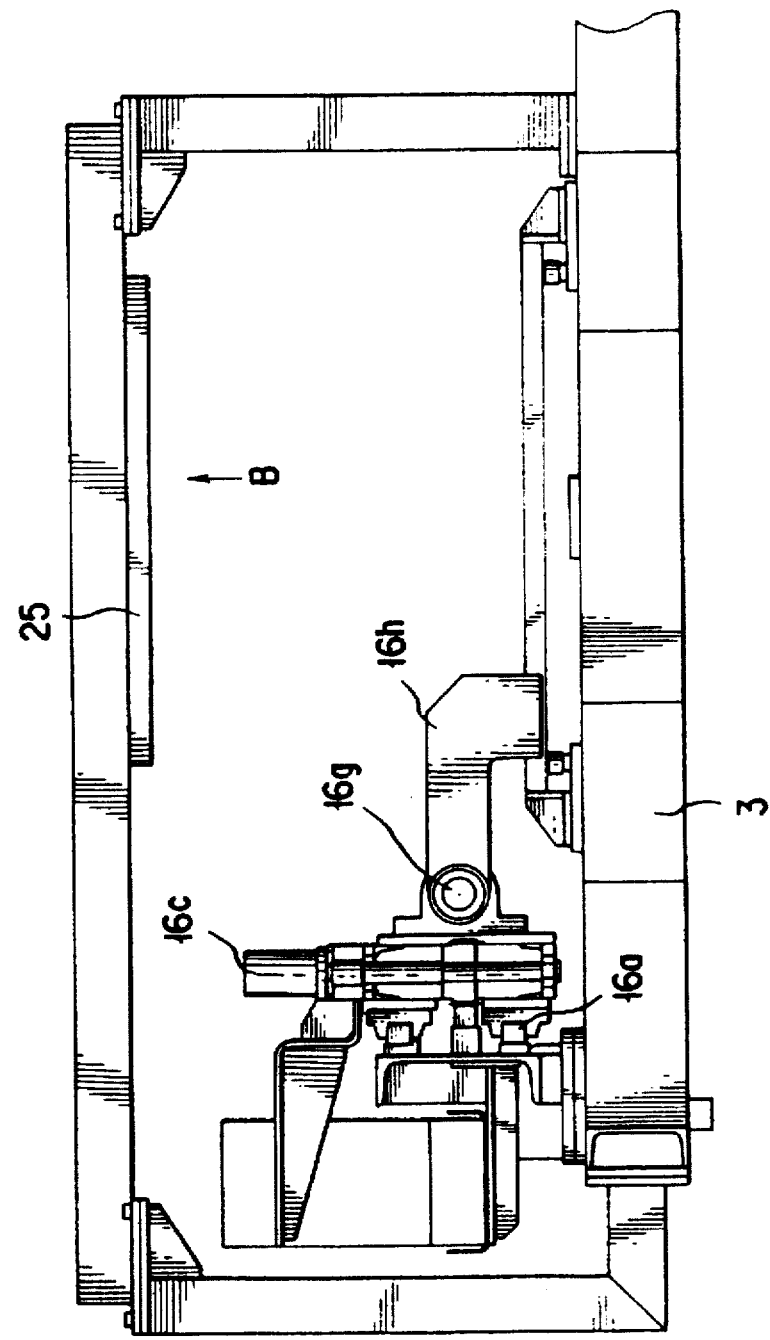
FIG. 37 is a front elevation of a blank detector of one embodiment of the unstacking feeder according to the invention.
Figure 38:
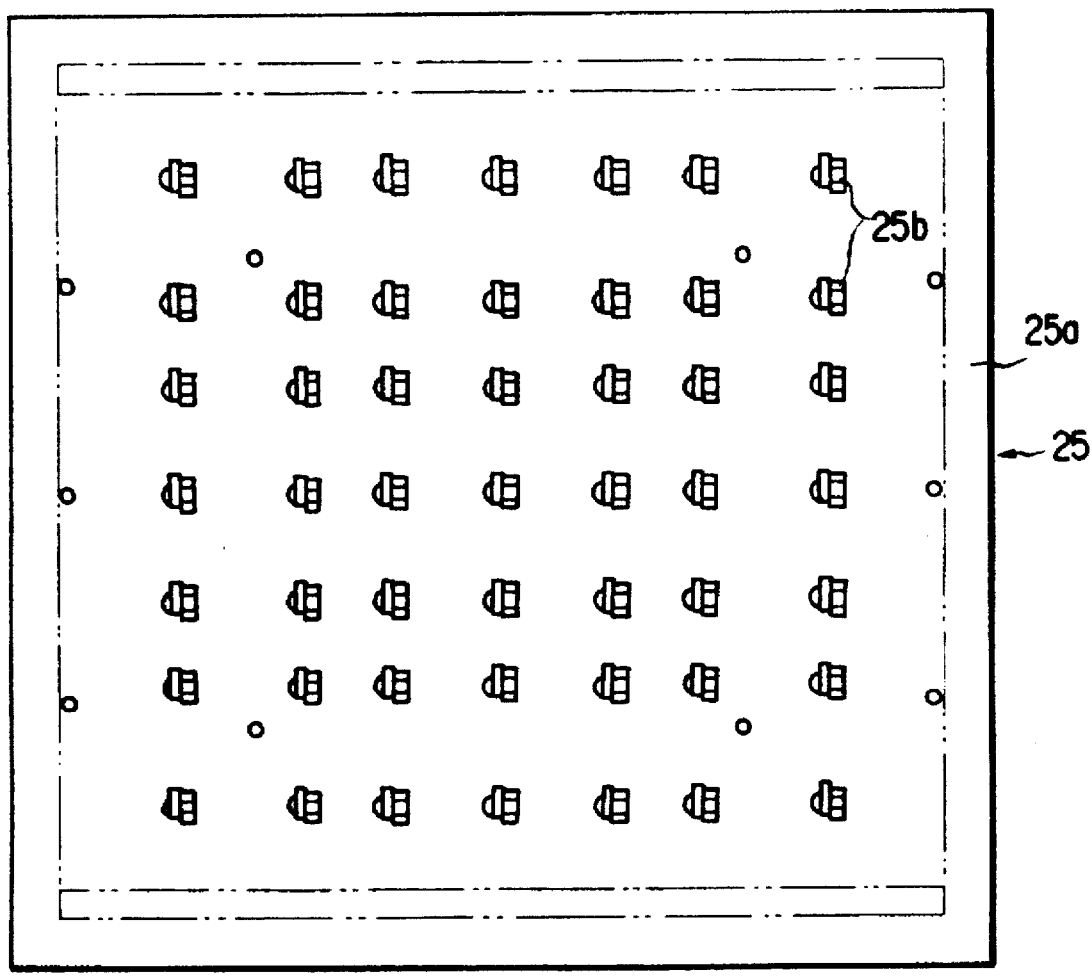
FIG. 38 is an illustration as seen in the direction of arrow B in FIG. 37.

On the other hand, FIGS. 37 and 38 show a blank detector 25 provided at the pallet infeed side of the pallet transporting device 3. The blank detector 25 has a mounting plate 25a having substantially the same size as the pallet 2 and being provided with detectors 25b arranged in substantially the same arrangement to the sheet stacks 1 in possible maximum number to mount on the pallet 2.

The detector 25b is an optoelectric detector, for example, to optically detect the sheet stack 1 on the pallet 2.

Next, operation will be discussed. When forming is performed by feeding a circular sheet material 1a to a transfer press 31, the sheet stacks 1 are mounted on the pallet 2 in the predetermined arrangement. Then, the pallet 2 is fed into the infeed side of the pallet transporting device 3. The magnetic floater 6 then shifts the shuttle 7c so that the floater 6₁ for the circular material is placed at the unstacking position A.

When operation is initiated at this condition, the rotary shaft 16g provided on the movable base 16b of the infeeding pallet shifter 16 is rotated about 90° by the rotary actuator 16i to contact the claw 16b to the read surface of the pallet 2.

At this condition, the movable base 16b is fed for one pitch in the pallet transporting direction (arrow PM) by the traveling motor 16c. At this position, a check is performed whether the sheet stack 1 is present on the pallet 2 or not by the blank detector 25.

Subsequently, by the infeeding pallet shifter 16, the pallet 2 is shifted in a further one pitch to be fed into the X-Y table 4 in the stand-by state.

On the X-Y table 4, the Y-axis stopper 4f, the X-axis stopper 4g and movable stoppers 4i and 4k are provided. By these stoppers, the pallet 2 is positioned on the predetermined position on the X-Y table 4. Thereafter, by the Y-axis direction motor 4p and the X-axis direction motor 4r, the X-Y table 4 is shifted in the X-Y direction. Then, the sheet stack 1 which initially supplies the sheet material 1a is positioned at the unstacking point a in the unstacking position A.

Then, at this condition, the piston rod 8b of the stack lifter 8 is expanded upwardly to pass through the through opening 2a opening through the pallet 2. Then, the receptacle seat 8c lifts up the sheet stack 1 on the pallet to the predetermined height.

Above the unstacking point a, the floater 6₁ for circular material is placed in stand-by state. The sheet stack 1 lifted up reaches between the floater members 6b of the floater 6₁ for the circular material. Then, the sheet material is separated in one-by-one fashion from the uppermost one by the magnetic effect of the floater members 6b.

The separated uppermost one of the sheet material is attracted by the vacuum cup 9c which is lowered down by the lift cylinder 9a and lifted up to the height where the magnetic conveyer 11 may magnetically hold it. Then, the sheet material is transferred to the magnetic conveyer 11.

The sheet material 1a held by the magnetic conveyer 11 is subject to a check of double blanks by the double blank detector 11a and reaches the skid lifter 10 via the second double blank detector 11b. The sheet material 1a is then mounted on the skid 10f lifted up by the lift cylinder 10d.

Subsequently, the skid 10f is lowered to the position where the transfer feeder 30 may hold the sheet material. At this position, the sheet material 1a is held by the transfer feeder and fed in a transfer press 31.

When supply of one stack of the sheet stack 1 is completed by repeating the foregoing operation, the X-Y table is again shifted to move the next sheet stack 1 to the unstacking point a. Then, supply of sheet material 1a through the foregoing operation is resumed.

When infeeding of all sheet stacks 1 on the pallet 2 is completed, the emptied pallet 2 is transported for one pitch in the X-axis direction by the cross pallet shifter 17 and positioned at the predetermined position between the stationary stopper 18k and the movable stopper 18j provided in the outfeed pallet shifter 18. During this period, the next pallet 2 is fed in the X-Y table 4 by the infeed pallet shifter 16 and supply of the sheet material from the next sheet stack 1 is initiated.

On the other hand, the emptied pallet 2 is transferred to the pallet reversing device 12 by the outfeed pallet shifter 18 and removed from the turn table 12a.

The operation discussed above is the case where the sheet material 1a is infed in the circular configuration. The case of infeeding the deformed sheet material will be discussed hereinafter.

Upon infeeding of the deformed sheet material, it is required that the magnetic floater 6 be adapted to the configuration of the deformed material.

The floaters 6₂ for the deformed material are provided with floater members 6b preliminarily prepared for adapting to the configurations of the deformed materials. A plurality, e.g. six, of floater members 6b are stored in respective shelves 5c of the floater rack 5. When the shelf 5c storing the floater 6₂ for the deformed material adapted to the deformed material to be infed, is designated, the shelf assembly 5b is shifted vertically by the lift cylinder 5g so that the designated shelf 5c is placed at the same height to the shuttle 7c of the floater exchanging device 7. Also, the rack body 5a is moved in the Y-axis direction by a longitudinal feed cylinder 5k so that the floater 6₂ for the deformed material stored in the designated shelf 5c is aligned with the shuttle 7c.

At this condition, the movable base 7f of the floater transfer mechanism 7d is shifted into the floater rack 5, and the rotary shaft 7h is rotated approximately 90° by the rotary actuator 7j. Thus, the claw body 7m provided on the rotary shaft 7h is engaged to the engaging portion 6p of the floater base 6a.

Thus, at this condition, the movable base 7f is moved to the side of the shuttle 7c by the traveling motor 7g. One of the floaters 6₂ for the deformed material engaging with the claw body 7m is transferred on the shuttle 7c and positioned and secured by the stopper 7p.

Subsequently, by the shuttle drive cylinder 7n, the shuttle 7c is shifted in the X-axis direction. Then, the floater 6₂ for the deformed material on the shuttle 7c is stopped at the unstacking position A.

When setting of the floater 6₂ for the deformed material is completed as set forth above, the pallet 2 mounted with the sheet stack 1 of the deformed material is fed in the transfer press 31 by circulating in the similar manner to that for the circular material.

On the other hand, when the deformed material is the configuration of the fraction of the circular material divided into two, and both fractions are mounted on the common pallet 2, it becomes necessary to turn the pallet for making the orientation of the sheet material 1a consistent.

Next, operation will be discussed. When the sheet stack 1 having the consistent orientation is fed in the transfer press 31 in the similar operation to that of infeeding of the circular material, the pallet 2 is once fed to the pallet reversing device 12.

By rotating the turning motor 12g, the turn table 12a is turned approximately 180° to make the orientation of the sheet stack 1 consistent with that of the already fed in sheet stack 1. Then, the pallet 2 is again shifted into the unstacking position A.

Then, the sheet stack 1 oriented in the one direction on the pallet 2 is reversed over 180° by the pallet reversing device to vary orientation of the sheet stack 1. Therefore, left and right parts and so forth may be formed by the transfer press 31.

It will be possible to provide identification indication, such as a bar code, for each respective floater 6₂ so that a desired floater can be accurately transferred from the floaters 6₂ for the deformed material stored in the floater rack 5, and to identify the floater by an automatic identification device.

On the other hand, it is possible to significantly shorten the sheet stack exchanging period by detecting the sheet stack 1 on the pallet 2 and by sequence controlling the X-Y table 4 so as to shift the targeted sheet stack to the unstacking point a through the minimum distance on the basis of the obtained information.

As set forth above, since the present invention is constructed to infeed a plurality of stacks of the sheet stacks mounted on the pallet to the unstacking position, and to position the selected sheet stack on the pallet at the unstacking point to supply to the press, it becomes possible to significantly reduce the frequency of exchanging of pallet and period required for exchanging in comparison with the conventional system, in which one sheet stack is mounted on the pallet for feeding to the press.

By this, productivity can be significantly improved. Also, by sequence controlling the X-Y table to make the selected sheet stack to reach to the unstacking point through the minimum distance of route, shortening of the stack exchanging period can be achieved to further improve productivity.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

We claim:

1. An unstacking feeder comprising:

a pallet transporting device for sequentially feeding pallets, each loaded with a plurality of stacks of sheets, to an unloading position and for feeding the pallets from the unloading position;

a stack lifter for feeding a selected stack from the pallet at the unloading position to an unstacking position;

a floater rack storing a plurality of floaters for unstacking irregularly shaped sheets;

a floater exchanging device which reciprocates between the floater rack and the unstacking position for moving the floaters from the rack to the unstacking position and returning the floaters to the rack from the unstacking position; and a vacuum lifter provided at the unstacking position which attracts sheets separated from the selected stack by the floater and transports the sheets to a magnetic conveyor.

2. An unstacking feeder comprising:

a pallet transporting device for sequentially feeding pallets, each loaded with a plurality of stacks of sheets, to an unloading position, whereby a selected stack from the pallet at the unloading position is movable to an unstacking position;

an X-Y table arranged at said unloading position for positioning a selected one of said sheet stacks on the pallet by shifting the infed pallet in an X-axis direction and a Y-axis direction; and said stack lifter being positioned below said unstacking position for lifting up the sheet stack to an unstacking position via a through opening in said pallet, at a position where a vacuum lifter may hold a topmost element of the sheet stack.

3. An automatic floater exchanging apparatus of an unstacking feeder, comprising:

a floater rack provided upstream of a press and placed in the vicinity of an unstacking position, and storing a plurality of floaters for deformed material, each of said floaters being stored at a predetermined position corresponding to the configuration of a sheet material;

a floater exchanging device having a shuttle movably positioned and reciprocating between said floater rack and said unstacking position for transporting said shuttle with the floater for deformed material taken out from said floater rack to said unstacking position, and transporting the used floater for the deformed material back to said position corresponding to said floater rack; and a floater transferring mechanism provided in the vicinity of said floater exchanging device for pulling out the floater for deformed material in said floater rack to load on a shuttle and storing the floater for the deformed material on the shuttle back to said floater rack.

4. An unstacking feeder comprising:

a pallet transporting device for sequentially feeding pallets, each loaded with a plurality of stacks of sheets, to an unloading position, whereby a selected stack from the pallet at the unloading position is movable to an unstacking position;

a floater exchanging device, positioned above said unstacking position and reciprocating between a position corresponding to a floater rack storing a plurality of floaters for deformed materials and said unstacking position for transporting the floater for deformed material taken out from said floater rack to said unstacking position, and transporting the used floater for the deformed material back to said position corresponding to said floater rack;

a floater transferring mechanism provided in the vicinity of said floater exchanging device for pulling out the floater for deformed material in said floater rack to a shuttle in said floater exchanging device and storing the used floater for the deformed material on the shuttle to said floater rack; and a vacuum lifter provided at said unstacking position for attracting a sheet material separated from the sheet stack by the floater and transporting the sheet material to a magnetic conveyer.

5. An unstacking feeder comprising:

sheet stack transporting means for transporting a sheet stack, in which a plurality of sheet materials are stacked, through a circulating transporting path across a predetermined unstacking position;

floater supply means for automatically supplying a floater corresponding to the configuration of the sheet material to said unstacking position for sequentially separating a respective individual sheet material of said sheet stack;

sheet material transporting means for transporting unstacked individual sheet material to a next process; and sheet material transferring means for transferring the individual sheet material separated by said floater to said sheet material transporting means wherein the floater supply means supplies one of a plurality of floaters stored at a location other than the unstacking position.

6. An unstacking feeder as set forth in claim 5, wherein said sheet stack transporting means includes a pallet moved along said circulating transporting path, and said sheet stack is mounted on said pallet to be transported.

7. An unstacking feeder as set forth in claim 6, wherein said pallet is designed to be mounted with a plurality of sheet stacks at respective predetermined positions, and further comprising means for positioning one of a plurality of sheet stacks to a predetermined unstacking point within said unstacking position.

8. An unstacking feeder comprising:

sheet stack transporting means for transporting a sheet stack, in which a plurality of sheet materials are stacked, through a circulating transporting path across a predetermined unstacking position;

floater supply means for automatically supplying a floater corresponding to the configuration of the sheet material to said unstacking position for sequentially separating a respective individual sheet material of said sheet stack, said floater supply means including a floater storage means arranged in the vicinity of said unstacking position at the side of said circulating transporting path, said floater storage means being designed for storing a plurality of floaters corresponding to mutually different configurations of the sheet materials, and said floater supply means selecting one of the floaters stored in said floater storage means depending upon the configuration of the material sheet to supply to said unstacking position;

sheet material transporting means for transporting unstacked individual sheet material to a next process; and sheet material transferring means for transferring the individual sheet material separated by said floater to said sheet material transporting means.

9. An unstacking feeder as set forth in claim 8, wherein said floater supply means includes a shuttle means for reciprocating between said floater storage means and said unstacking position, and a floater transferring means for transferring the floater between said floater storage means and said shuttle.

10. An unstacking feeder comprising:

sheet stack transporting means for transporting a plurality of sheet stacks loaded on the sheet stack transporting means through a circulating transporting path across a predetermined unstacking position;

floater storage means arranged in the vicinity of said circulating transporting path for storing a plurality of floaters corresponding to configuration of respective sheet materials for sequentially separating each individual sheet material in said sheet stack;

floater selecting and supplying means for selecting one of the floaters stored in said floater storage means depending upon the configuration of the sheet material for automatically selecting and supplying the one of the floaters to said unstacking position;

sheet material transporting means for transporting unstacked individual sheet material to a next process; and sheet transferring means for transferring the unstacked individual sheet material separated by said floater to said sheet material transporting means.

11. An unstacking feeder comprising:

sheet stack transporting means for transporting a plurality of sheet stacks loaded on the sheet stack transporting means through a circulating transporting path across a predetermined unstacking position;

floater storage means arranged in the vicinity of said circulating transporting path for storing a plurality of floaters corresponding to configuration of respective sheet materials for sequentially separating each individual sheet material in said sheet stack;

floater automatic selecting and supplying means for selecting one of the floaters stored in said floater storage means depending upon the configuration of the sheet material for automatically selecting and supplying the one of the floaters to said unstacking position, and comprising shuttle means for reciprocally moving between a position corresponding to said floater storage means and said unstacking position, and floater transferring means for transferring said floater between said floater storage means and said shuttle means;

sheet material transporting means for transporting unstacked individual sheet material to a next process; and sheet transferring means for transferring the individual sheet material separated by said floater to said sheet material transporting means.

12. An unstacking feeder comprising:

sheet stack transporting means for transporting a plurality of sheet stacks loaded on the sheet stack transporting means along a circulating transporting path across an unstacking position;

sheet stack positioning means for positioning a selected one of said plurality of sheet stacks to a predetermined unstacking point in said unstacking position;

floater storage means arranged in the vicinity of a circulating transporting path for storing a plurality of floaters corresponding to configuration of respective sheet materials for sequentially separating each individual sheet material in said sheet stack;

floater selecting and supplying means for selecting one of the floaters stored in said floater storage means depending upon the configuration of the sheet material to be handled for automatically selecting and supplying the one of the floaters to said unstacking position;

sheet material transporting means for transporting unstacked individual sheet material to a next process; and sheet transferring means for transferring the individual sheet material separated by said floater to said sheet material transporting means.

* * * * *